(12) United States Patent
Kuwata

(10) Patent No.: US 8,340,497 B2
(45) Date of Patent: Dec. 25, 2012

(54) RECORDING APPARATUS, RECORDING METHOD, REPRODUCING APPARATUS, REPRODUCING METHOD, AND PROGRAM

(75) Inventor: Masayuki Kuwata, Tokyo (JP)

(73) Assignee: Sony Corporation, Tokyo (JP)

( * ) Notice: Subject to any disclaimer, the term of this patent is extended or adjusted under 35 U.S.C. 154(b) by 1492 days.

(21) Appl. No.: 11/218,633

(22) Filed: Sep. 6, 2005

(65) Prior Publication Data

US 2006/0055798 A1    Mar. 16, 2006

(30) Foreign Application Priority Data

Sep. 8, 2004   (JP) ................ P2004-260536

(51) Int. Cl.
*H04N 9/80* (2006.01)

(52) U.S. Cl. .............. 386/241; 386/239; 386/355

(58) Field of Classification Search ........... 386/95, 386/96, 125–126
See application file for complete search history.

(56) References Cited

U.S. PATENT DOCUMENTS

| 6,798,407 | B1 * | 9/2004 | Benman | 345/419 |
| 7,194,703 | B2 * | 3/2007 | Yokomizo | 715/867 |
| 2003/0227493 | A1 * | 12/2003 | Yokomizo | 345/867 |

FOREIGN PATENT DOCUMENTS

| JP | 2000-175158 | 6/2000 |
| JP | 2001-111963 | 4/2001 |
| JP | 2003-274368 | 9/2003 |

* cited by examiner

*Primary Examiner* — Jamie Atala

(74) *Attorney, Agent, or Firm* — Finnegan, Henderson, Farabow, Garrett & Dunner LLP

(57) ABSTRACT

Disclosed is a recording apparatus to record data in a recording medium. The apparatus includes: an input portion to input moving picture data; an encode portion to encode the moving picture data input by the input portion; a storage portion which uses a first storage area to store frame image data, i.e., data for any frame image contained in the moving picture data encoded by the encode portion and uses a second storage area to store the moving picture data except the frame image data; a recording portion to record the moving picture data stored by the storage portion in the recording medium; a decode portion to decode the moving pictured at a encoded by the encode portion; and a thumbnail image generation portion to generate a thumbnail image based on the frame image data.

12 Claims, 15 Drawing Sheets

FIG.6

| HEADER | AV STREAM | SAMPLE TABLE |
|---|---|---|

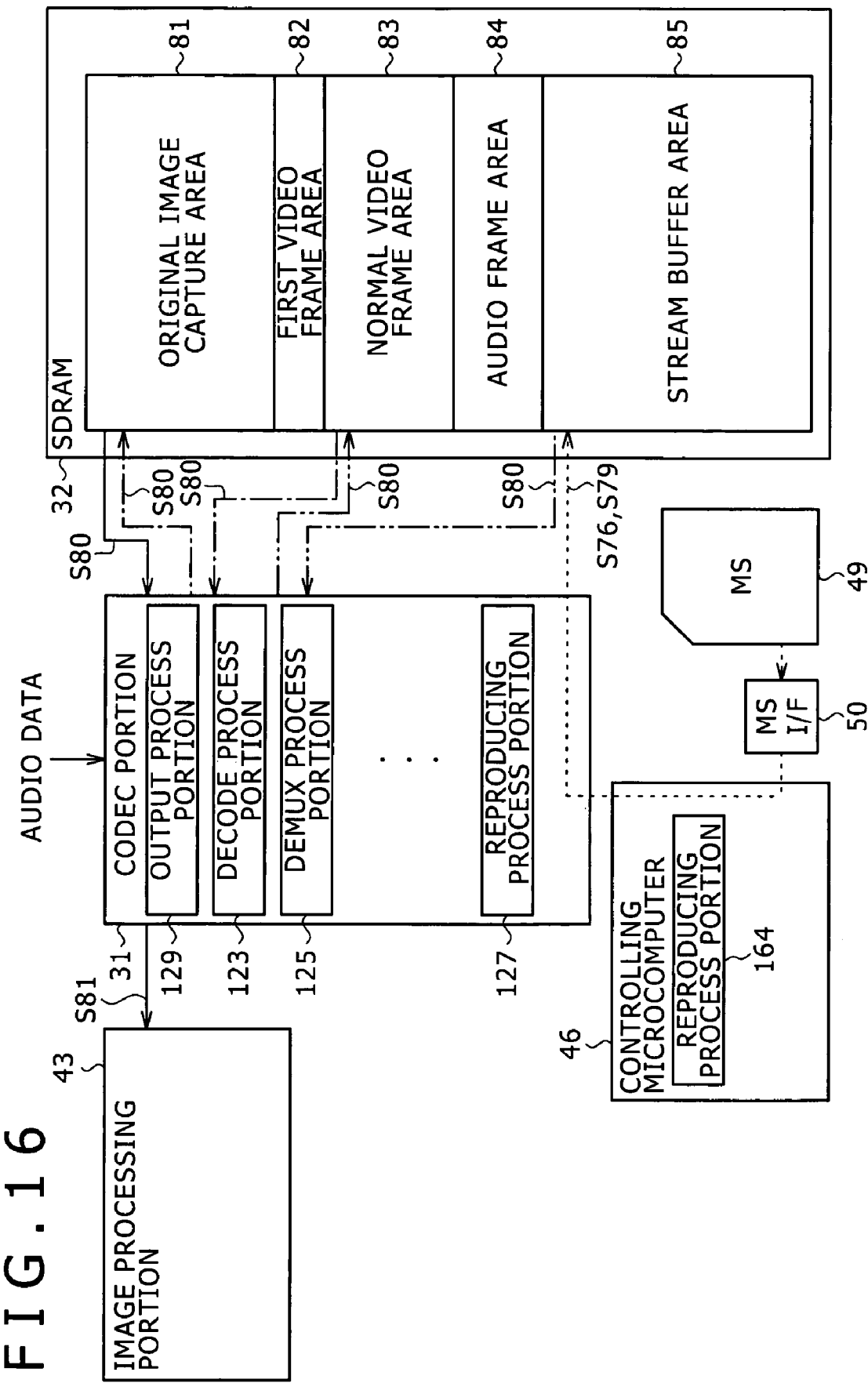

RECORDING APPARATUS, RECORDING METHOD, REPRODUCING APPARATUS, REPRODUCING METHOD, AND PROGRAM

CROSS REFERENCES TO RELATED APPLICATIONS

The present invention contains subject matter related to Japanese Patent Application JP 2004-260536 filed in the Japanese Patent Office on Sep. 8, 2004, the entire contents of which being incorporated herein by reference.

BACKGROUND OF THE INVENTION

1. Field of the Invention

The present invention relates to a recording apparatus, a recording method, a reproducing apparatus, a reproducing method, and a program, and more particularly to a recording apparatus, a recording method, are producing apparatus, are producing method, and a program so as to be capable of fast displaying images.

2. Description of Related Art

When a recording apparatus records an AV (Audio Video) stream file on a recording medium, for example, the recording apparatus encodes AV data into the MPEG format for recording on the recording medium (e.g., see JP-A No. 111963/2001).

As another example, there is provided a reproducing apparatus to reproduce a moving picture file that is encoded based on the MPEG (Moving Picture Expert Group) 1 standard and is recorded on a recording medium. Such reproducing apparatus analyzes the moving picture file from the beginning to decode. a first video frame and display it on a display portion.

There is provided a reproducing apparatus to reproduce an AV stream file (moving picture file) that is encoded based on the MP4 file format (file format defined by the part 14 in the MPEG4) standard and is recorded on a recording medium. This reproducing apparatus reads a sample table (MOOV) from the AV stream file to analyze the position of a first video frame. The reproducing apparatus then reads the first video frame from the AV stream file, decodes it, and displays it on a display portion. Consequently, it takes time to display an image corresponding to the first video frame on the display portion.

After selection of an AV stream file encoded based on the MP4 file format standard, for example, such reproducing apparatus may display a message such as "Access in process" while the AV stream file is read. However, the wait time may stress a user.

When an AV stream file is selected, the reproducing apparatus may display a representative image such as a thumbnail image. When reproduction is specified, the reproducing apparatus may newly read an AV stream file corresponding to the thumbnail image and start analyzing the AV stream file. Also in this case, however, it takes time while the reproduction is specified and then starts.

The present invention has been made in consideration of the foregoing. It is desirable to fast display images.

SUMMARY OF THE INVENTION

One embodiment of the present invention is directed to a recording apparatus composed of: an input portion to input moving picture data; an encode portion to encode the moving picture data input by the input portion; a storage portion which uses a first storage area to store frame image data, i.e., data for any frame image contained in the moving picture data encoded by the encode portion and uses a second storage area to store the moving picture data except the frame image data; a recording portion to record the moving picture data stored by the storage portion in the recording medium; a decode portion to decode the moving picture data encoded by the encode portion; and a thumbnail image generation portion to generate a thumbnail image based on the frame image data. The recording portion records, as a moving picture file, the frame image data stored in the first storage area together with moving picture data stored in the second storage area except the frame image data. The decode portion decodes the frame image data stored in the first storage area. The thumbnail image generation portion generates thumbnail image data based on the frame image data decoded by the decode portion. The recording portion composes a thumbnail image file from the thumbnail image data generated by the thumbnail image generation portion and records the thumbnail image file in association with the recorded moving picture file.

There may be further provided a compression portion to compress the thumbnail image data generated by the thumbnail image generation portion in a format for still picture processing. The recording portion may record the thumbnail image data compressed by the compression portion as a thumbnail image file in association with the recorded moving picture file.

The frame image data may be equivalent to beginning frame image data in the moving picture data.

The encode portion may encode the moving picture data based on an MP4 file format standard. The decode portion may decode the encoded moving picture data based on the MP4 file format standard.

Another embodiment of the present invention is directed to a recording method composed of: an input step of inputting moving picture data; an encode step of encoding the moving picture data input by a process at the input step; a first storage control step of controlling storage so that a first storage area of a storage portion stores frame image data, i.e., data for any frame image contained in the moving picture data encoded by a process at the encode step; a second storage control step of controlling storage so that a second storage area of the storage portion stores the moving picture data encoded by a process at the encode step except the frame image stored in the first storage area; a first recording control step of controlling recording so as to record, as a moving picture file in the recording medium, the frame image data stored in the first storage area together with moving picture data stored in the second storage area except the frame image data; a decode step of decoding the frame image data stored in the first storage area; a thumbnail image generation step of generating thumbnail image data based on the frame image data decoded by a process at the decode step; and a second recording control step of controlling recording so as to compose a thumbnail image file from the thumbnail image data generated by a process at the thumbnail image generation step and record the thumbnail image data in association with the recorded moving picture file.

Still another embodiment of the present invention is directed to a first program that allows a computer to perform a process containing: an input step of inputting moving picture data; an encode step of encoding the moving picture data input by a process at the input step; a first storage control step of controlling storage so that a first storage area of a storage portion stores frame image data, i.e., data for any frame image contained in the moving picture data encoded by a process at the encode step; a second storage control step of controlling storage so that a second storage area of the storage portion stores the moving picture data encoded by a process at the encode step except the frame image stored in the first storage area; a first recording control step of controlling recording so as to record, as a moving picture file in the recording medium, the frame image data stored in the first storage area together with moving picture data stored in the second storage area except the frame image data; a decode step of decoding the frame image data stored in the first storage area; a thumbnail image generation step of generating thumbnail image data based on the frame image data decoded by a process at the decode step; and a second recording control step of controlling recording so as to compose a thumbnail image file from the thumbnail image data generated by a process at the thumbnail image generation step and record the thumbnail image data in association with the recorded moving picture file.

In the embodiment, the configuration is made as follows. Input moving picture data is to be encoded. The first storage area in the storage portion stores data for any frame image out of the encoded moving picture data. The second storage area in the storage portion stores the remaining moving picture data. The frame image data in the first storage area and the moving picture data in the second storage area are unified to form a moving picture file that is then stored in the recording medium. The frame image data in the first storage area is further decoded to generate thumbnail image data. The thumbnail image is recorded in the recording medium in association with the moving picture file.

Yet another embodiment of the present invention is directed to a reproducing apparatus composed of: a read portion to read the moving picture file and the thumbnail image file associated with the moving picture file from the recording medium; and a display control portion which controls a display portion so as to display a thumbnail image based on the thumbnail image file read by the read portion and a moving picture based on the moving picture file. When the moving picture file is selected, the read portion reads the thumbnail image file associated with the moving picture file. The display control portion controls a display portion so as to display a thumbnail image based on the thumbnail image file read by the read portion. The read portion further reads the moving picture file. When the read portion has completed reading of a beginning frame in the moving picture file, the display control portion controls a display portion so as to display a moving picture based on the moving picture file instead of the thumbnail image displayed on the display portion.

There may be further provided a decompression portion to decompress compressed thumbnail image data for the thumbnail image file; and a decode portion to decode the encoded moving picture data for the moving picture file. When the moving picture file is selected, the read portion reads the thumbnail image file associated with the moving picture file. The decompression portion decompresses compressed thumbnail image data for the thumbnail image file read by the read portion. The display control portion controls a display portion so as to display a thumbnail image based on the thumbnail image data decompressed by the decompression portion. The read portion further reads the moving picture file. The decode portion decodes encoded moving picture data for the moving picture file read by the read portion. When the decode portion has completed decoding of the moving picture data, the display control portion controls a display portion so as to display a moving picture based on the moving picture data instead of the thumbnail image displayed on the display portion.

The thumbnail image data may correspond to beginning frame image data in the moving picture file.

The thumbnail image data may correspond to beginning frame image data in the moving picture file. There may be further provided a decompression portion to decompress compressed thumbnail image data for the thumbnail image file; and a decode portion to decode the encoded moving picture data for the moving picture file. When the moving picture file is selected, the read portion reads the thumbnail image file associated with the moving picture file. The decompression portion decompresses compressed thumbnail image data for the thumbnail image file read by the read portion. The display control portion controls a display portion so as to display a thumbnail image based on the thumbnail image data decompressed by the decompression portion. The read portion further reads beginning frame image data in the moving picture file. The decode portion decodes encoded beginning frame image data in the moving picture file read by the read portion. When the decode portion has completed decoding of the beginning frame image data, the display control portion controls the display portion so as to display an image based on the beginning frame image data instead of the thumbnail image displayed on the display portion. When the display control portion allows the display portion to display an image based on the beginning frame image data in the moving picture file and then commands reproduction of a moving picture file, the read portion sequentially reads second and later frame image data in the moving picture file. The decode portion sequentially decodes encoded second and later frame image data in the moving picture file read by the read portion. The display control portion sequentially controls the display portion so as to display a moving picture based on second and later frame image data decoded by the decode portion in the moving picture file.

The moving picture data contained in the moving picture file recorded on the recording medium may be encoded based on an MP4 file format standard. The decode portion may decode the encoded moving picture data based on the MP4 file format standard.

Still yet another embodiment of the present invention is directed to a reproduction method including: a first read step of reading the thumbnail image file associated with the moving picture file, when selected, from the recording medium; a first display control step of controlling a display portion so as to display a thumbnail image based on the thumbnail image file read by a process at the first read step; a second read step of reading the moving picture file from the recording medium; and a second display control step of, when a process at the second read step has completed reading of a beginning frame in the moving picture file, controlling the display portion so as to display a moving picture based on the moving picture file instead of the thumbnail image displayed on the display portion.

Yet still another embodiment of the present invention is directed to a second program that allows a computer to perform a process containing: a first read step of reading the thumbnail image file associated with the moving picture file, when selected, from the recording medium; a first display control step of controlling a display portion so as to display a thumbnail image based on the thumbnail image file read by a process at the first read step; a second read step of reading the moving picture file from the recording medium; and a second display control step of, when a process at the second read step has completed reading of a beginning frame in the moving picture file, controlling the display portion so as to display a moving picture based on the moving picture file instead of the thumbnail image displayed on the display portion.

In the embodiment, the configuration is made as follows. When a moving picture file is selected, the thumbnail image file associated with the moving picture file is to be read from the recording medium. Control is provided to display the thumbnail image on the display portion based on the read thumbnail image file. In addition, the moving picture file is read from the recording medium. When a process has completed reading of a beginning frame in the moving picture file, a moving picture based on the moving picture file is displayed instead of the thumbnail image displayed on the display portion.

According to the embodiments, moving picture files can be recorded. Specifically, a moving picture file in association with a thumbnail image file can be recorded.

According to the embodiments, images can be displayed fast. Specifically, when a moving picture file is selected, the configuration is so made as to first display the thumbnail image, which is in association with the moving picture file.

BRIEF DESCRIPTION OF THE DRAWINGS

Embodiments of the present invention will be described in detail based on the following figures, wherein:

FIG. 6 concisely diagrams a stream file format based on the MP4 file format standard;

FIG. 16 shows a flow of moving picture data in the reproducing process.

DETAILED DESCRIPTION OF THE PREFERRED EMBODIMENTS

Embodiments of the present invention will be described below. The following exemplifies correspondence between the invention described in the specification and embodiments of the invention. The description to follow aims at confirming that the specification describes embodiments supporting the invention described in the specification. Accordingly, there may be an embodiment that is described in the embodiments of the invention but is not described here as the one compliant with the invention. This does not signify that the embodiment does not comply with the invention. By contrast, when an embodiment is described here as the one compliant with the invention, this does not signify that the embodiment does not comply with the other inventions than the present invention.

Further, the description does not signify the whole of the invention described in the specification. In other words, the description does not deny the presence of not only the invention described in the specification, but also an invention that might be subject to divisional application or might be submitted or added due to correction in the future.

Figure 3:
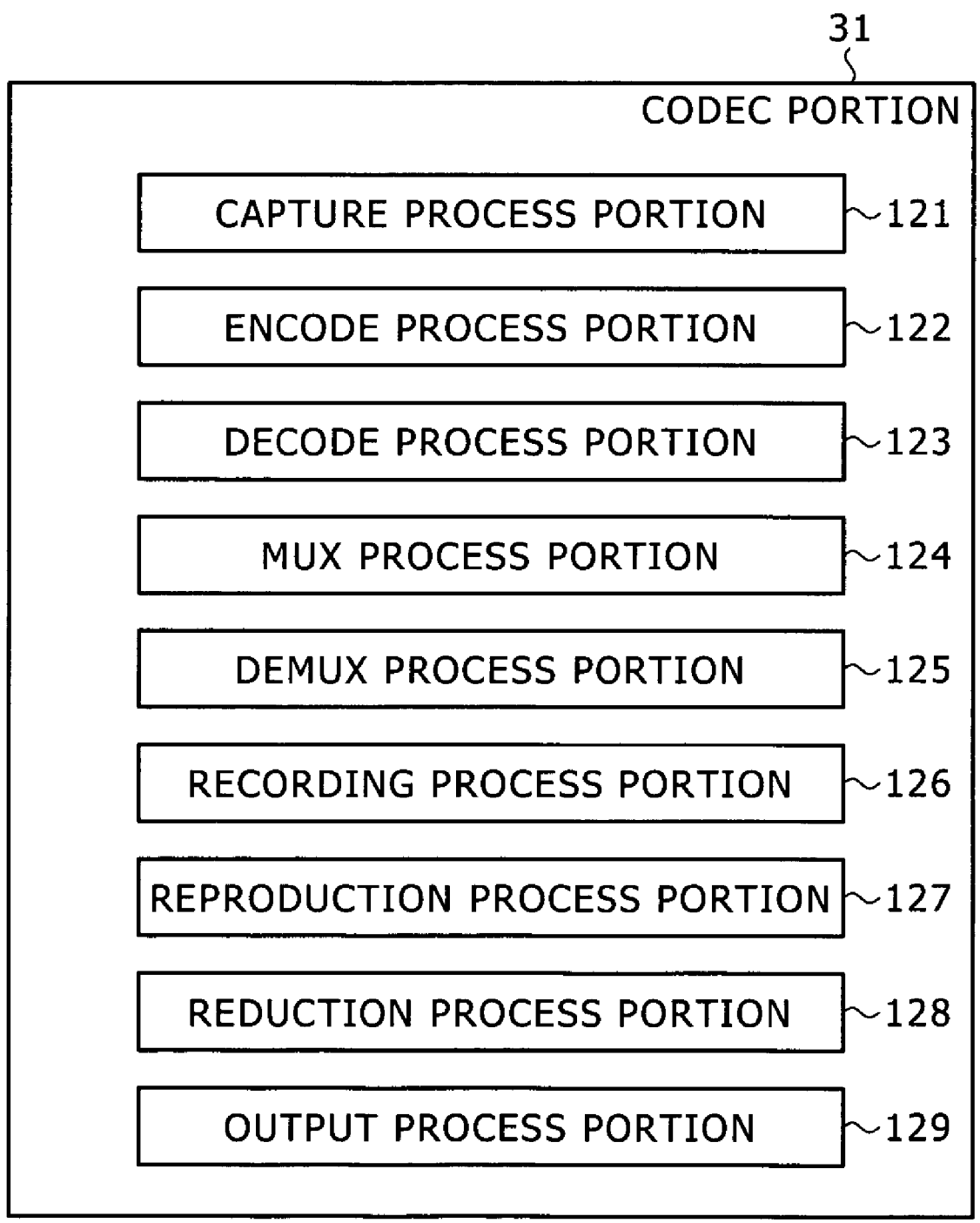
FIG. 3 is a block diagram exemplifying the functional configuration of a CODEC portion in FIG. 1.
Figure 8:
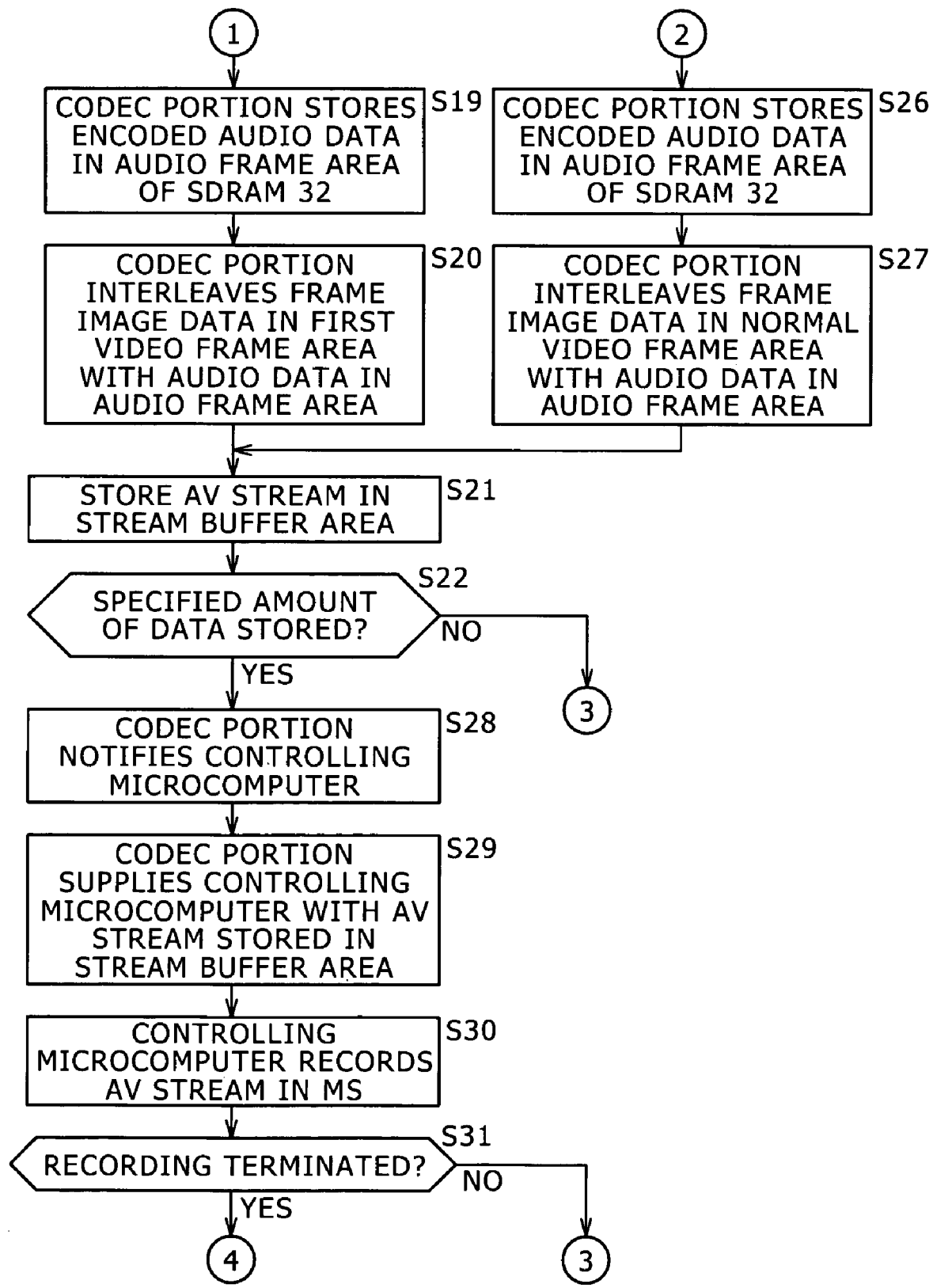
FIG. 8 is a flowchart showing a recording process in the recording and reproducing apparatus in FIG. 1.
Figure 9:
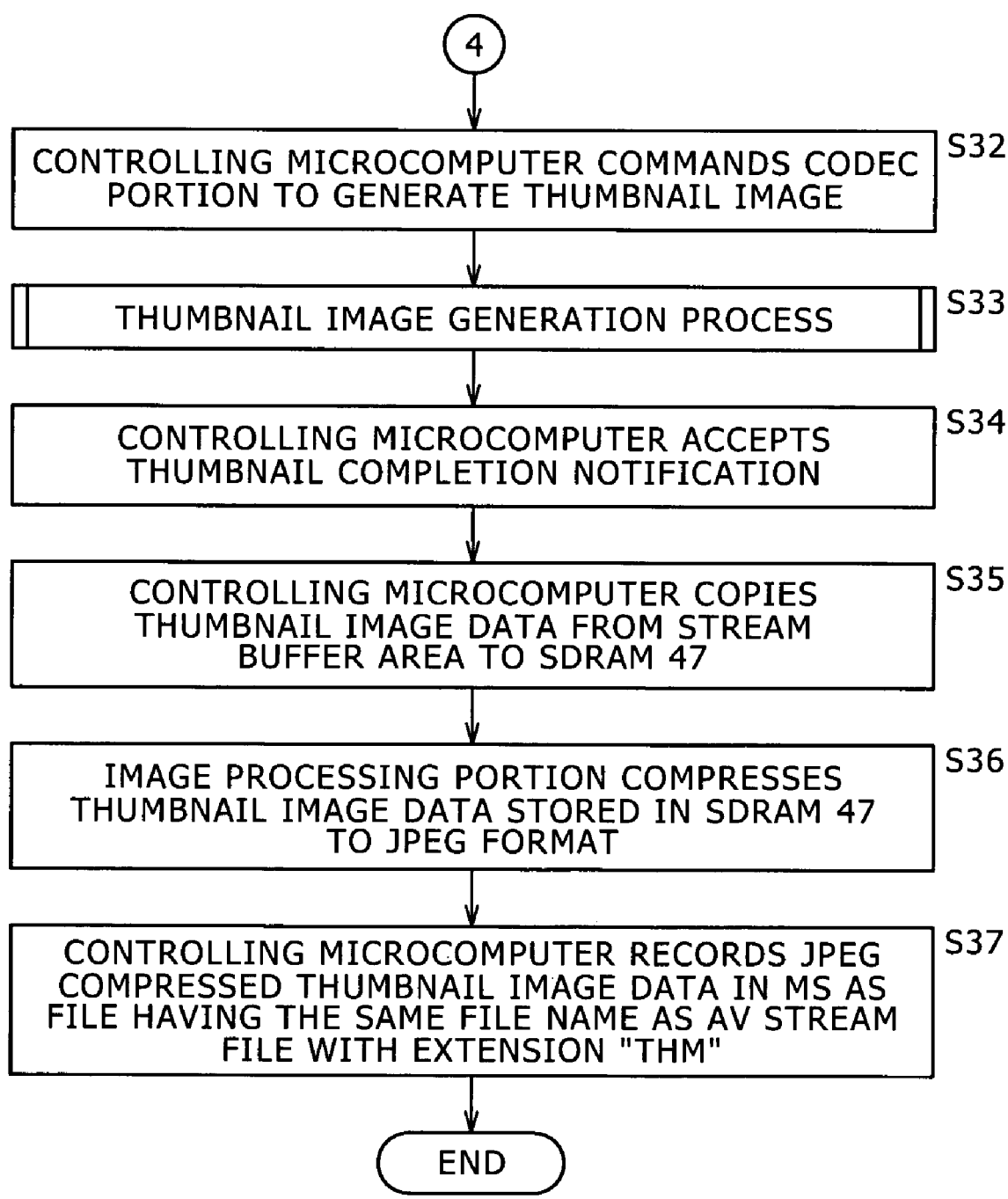
FIG. 9 is a flowchart showing a recording process in the recording and reproducing apparatus in FIG. 1.
Figure 12:
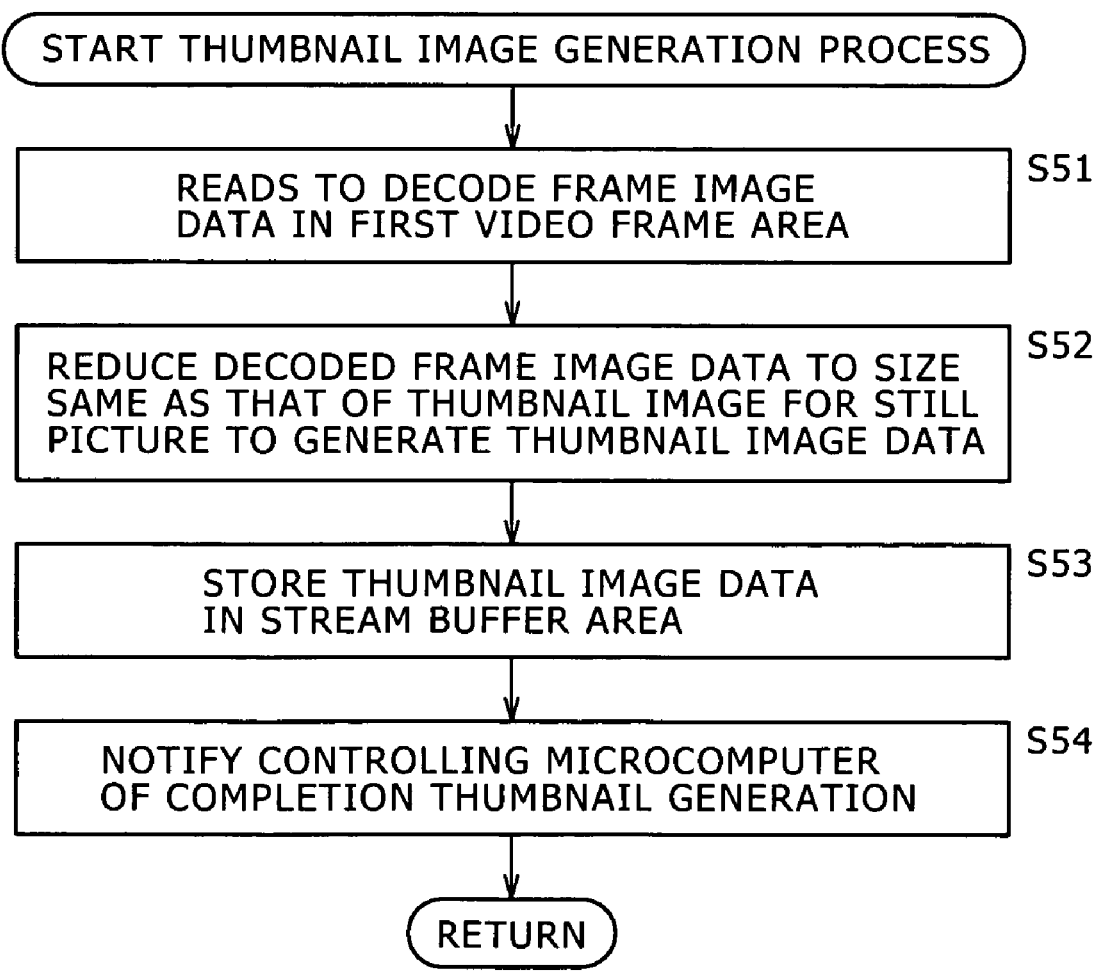
FIG. 12 is a flowchart showing details of a thumbnail image generation process.

A recording apparatus according to an embodiment of the present invention is represented by a recording apparatus (e.g., a recording and reproducing apparatus 1 in FIG. 1) to record data in a recording medium (e.g., MS 49 in FIG. 1) and includes:

an input portion (e.g., an image processing portion 43 in FIG. 1) to input moving picture data;

an encode portion (e.g., an encode process portion 122 of a CODEC portion 31 in FIG. 3) to encode the moving picture data input by the input portion;

a storage portion (e.g., SDRAM 32 in FIG. 2) which uses a first storage area (e.g., a first video frame area 82 in FIG. 2) to store frame image data, i.e., data for any frame image contained in the moving picture data encoded by the encode portion and uses a second storage area (e.g., a normal video frame area 83 in FIG. 2) to store the moving picture data except the frame image data;

a recording portion (e.g., a controlling microcomputer 46 in FIG. 1) to record the moving picture data stored by the storage portion in the recording medium;

a decode portion (e.g., a decode process portion 123 of the CODEC portion 31 in FIG. 3) to decode the moving picture data encoded by the encode portion; and a thumbnail image generation portion (e.g., a reduction process portion 128 of the CODEC,portion 31 in FIG. 3) to generate a thumbnail image based on the frame image data, wherein the recording portion records, as a moving picture file, the frame image data stored in the first storage area together with moving picture data stored in the second storage area except the frame image data (e.g., Step S30 in FIG. 8);

wherein the decode portion decodes the frame image data stored in the first storage area (e.g., Step S51 in FIG. 12);

wherein the thumbnail image generation portion generates thumbnail image data based on the frame image data decoded by the decode portion (e.g., Step S52 in FIG. 12); and wherein the recording portion composes a thumbnail image file from the thumbnail image data generated by the thumbnail image generation portion and records the thumbnail image file in association with the recorded moving picture file (e.g., Step S37 in FIG. 9).

Figure 4:
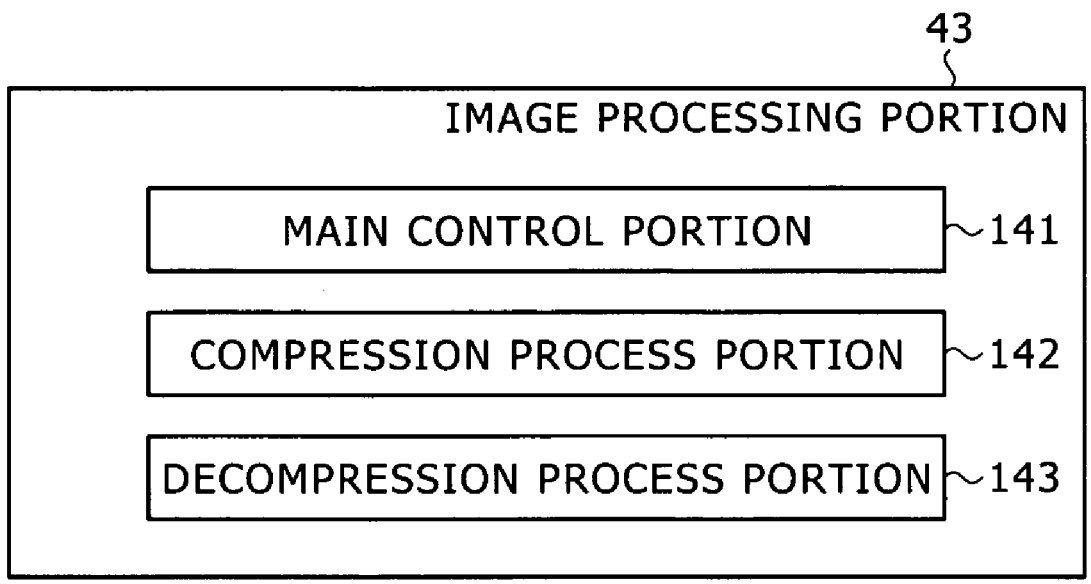
FIG. 4 is a block diagram exemplifying the functional configuration of an image processing portion in FIG. 1.

A recording apparatus according to an embodiment of the present invention further includes:

a compression portion (e.g., a compression process portion 142 of the image processing portion 43 in FIG. 4 to perform a process at Step S36 in FIG. 9) to compress the thumbnail image data generated by the thumbnail image generation portion in a format for still picture processing, wherein the recording portion records the thumbnail image data compressed by the compression portion as a thumbnail image file in the recording medium in association with the recorded moving picture file (e.g., Step S37 in FIG. 9).

The frame image data for the recording apparatus according to an embodiment of the present invention is equivalent to beginning frame image data in the moving picture data.

The encode portion of the recording apparatus according to an embodiment of the present invention encodes the moving picture data based on an MP4 file format standard, wherein the decode portion decodes the encoded moving picture data based on the MP4 file format standard.

A recording method according to an embodiment of the present invention for a recording apparatus (e.g., a recording and reproducing apparatus 1 in FIG. 1) to record data in a recording medium includes:

an input step (e.g., Step S13 in FIG. 7) of inputting moving picture data;

an encode step (e.g., Step S14 in FIG. 7) of encoding the moving picture data input by a process at the input step;

a first storage control step (e.g., Step S16 in FIG. 7) of controlling storage so that a first storage area (e.g., a first video frame area 82 in FIG. 2) of a storage portion (e.g., SDRAM 32 in FIG. 3) stores frame image data, i.e., data for any frame image contained in the moving picture data encoded by a process at the encode step;

a second storage control step (e.g., Step S23 in FIG. 7) of controlling storage so that a second storage area (e.g., the normal video frame area 83 in FIG. 2) of the storage portion stores the moving picture data encoded by a process at the encode step except the frame image stored in the first storage area;

a first recording control step (e.g., Step S30 in FIG. 8) of controlling recording so as to record, as a moving picture file in the recording medium, the frame image data stored in the first storage area together with moving picture data stored in the second storage area except the frame image data;

a decode step (e.g., Step S51 in FIG. 12) of decoding the frame image data stored in the-first storage area;

a thumbnail image generation step (e.g., Step S52 in FIG. 12) of generating thumbnail image data based on the frame image data decoded by a process at the decode step; and a second recording control step (e.g., Step S37 in FIG. 9) of controlling recording so as to compose a thumbnail image file from the thumbnail image data generated by a process at the thumbnail image generation step and record the thumbnail image data on the recording medium in association with the recorded moving picture file.

A program according to an embodiment of the present invention controls processes to record data on a recording medium and allows a computer to perform a process including:

an input step (e.g., Step S13 in FIG. 7) of inputting moving picture data;

an encode step (e.g., Step S14 in FIG. 7) of encoding the moving picture data input by a process at the input step;

a first storage control step (e.g., Step S16 in FIG. 7) of controlling storage so that a first storage area (e.g., the first video frame area 82 in FIG. 2) of a storage portion (e.g., the SDRAM 32 in FIG. 3) stores frame image data, i.e., data for any frame image contained in the moving picture data encoded by a process at the encode step;

a second storage control step (e.g., Step S23 in FIG. 7) of controlling storage so that a second storage area (e.g., the normal video frame area 83 in FIG. 2) of the storage portion stores the moving picture data encoded by a process at the encode step except the frame image stored in the first storage area;

a first recording control step (e.g., Step S30 in FIG. 8) of controlling recording so as to record, as a moving picture file in the recording medium, the frame image data stored in the first storage area together with moving picture data stored in the second storage area except the frame image data;

a decode step (e.g., Step S51 in FIG. 12) of decoding the frame image data stored in the first storage area;

a thumbnail image generation step (e.g., Step S52 in FIG. 12) of generating thumbnail image data based on the frame image data decoded by a process at the decode step; and a second recording control step (e.g., Step S37 in FIG. 9) of controlling recording so as to compose a thumbnail image file from the thumbnail image data generated by a process at the thumbnail image generation step and record the thumbnail image data in association with the recorded moving picture file.

Figure 5:
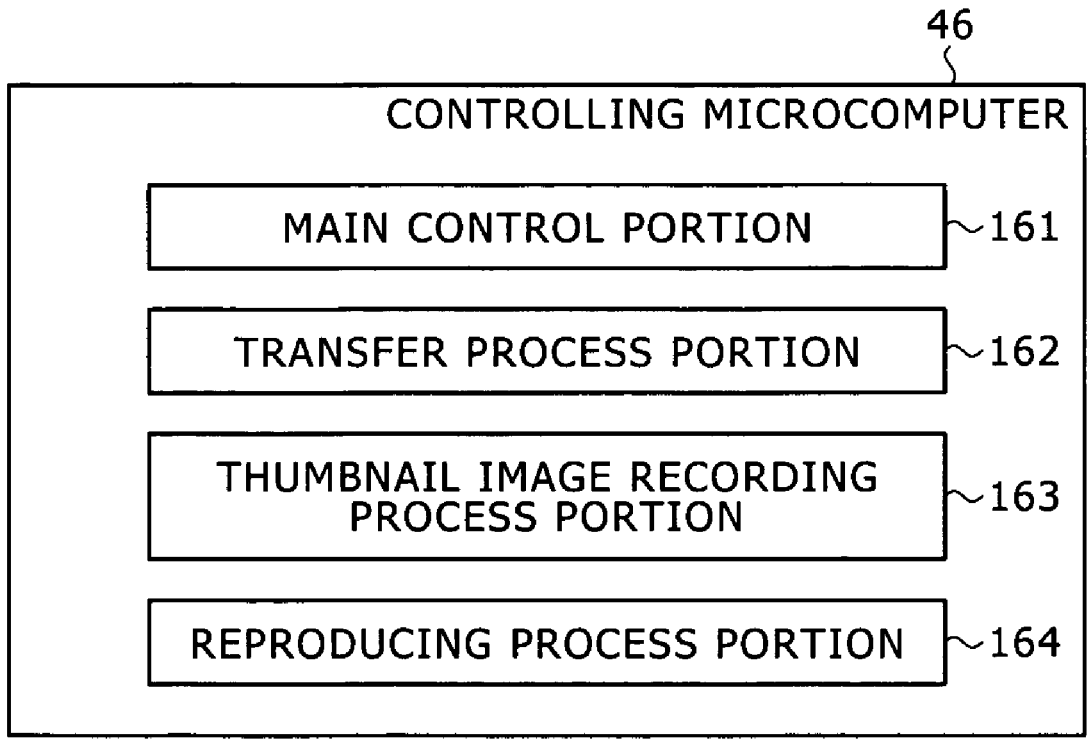
FIG. 5 is a block diagram exemplifying the functional configuration of a controlling microcomputer in FIG. 1.
Figure 13:
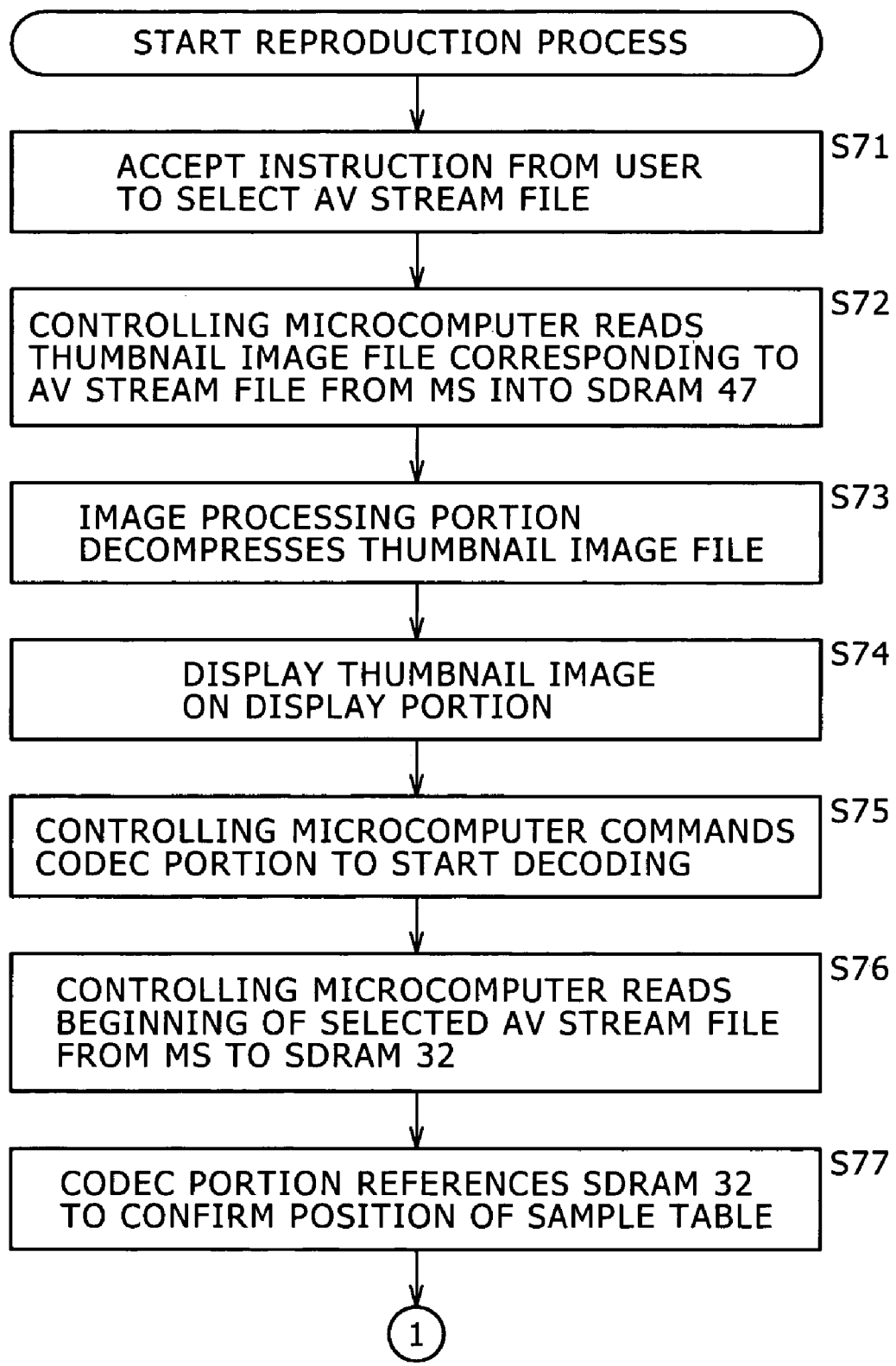
FIG. 13 is a flowchart showing a reproducing process in the recording and reproducing apparatus in FIG. 1.
Figure 14:
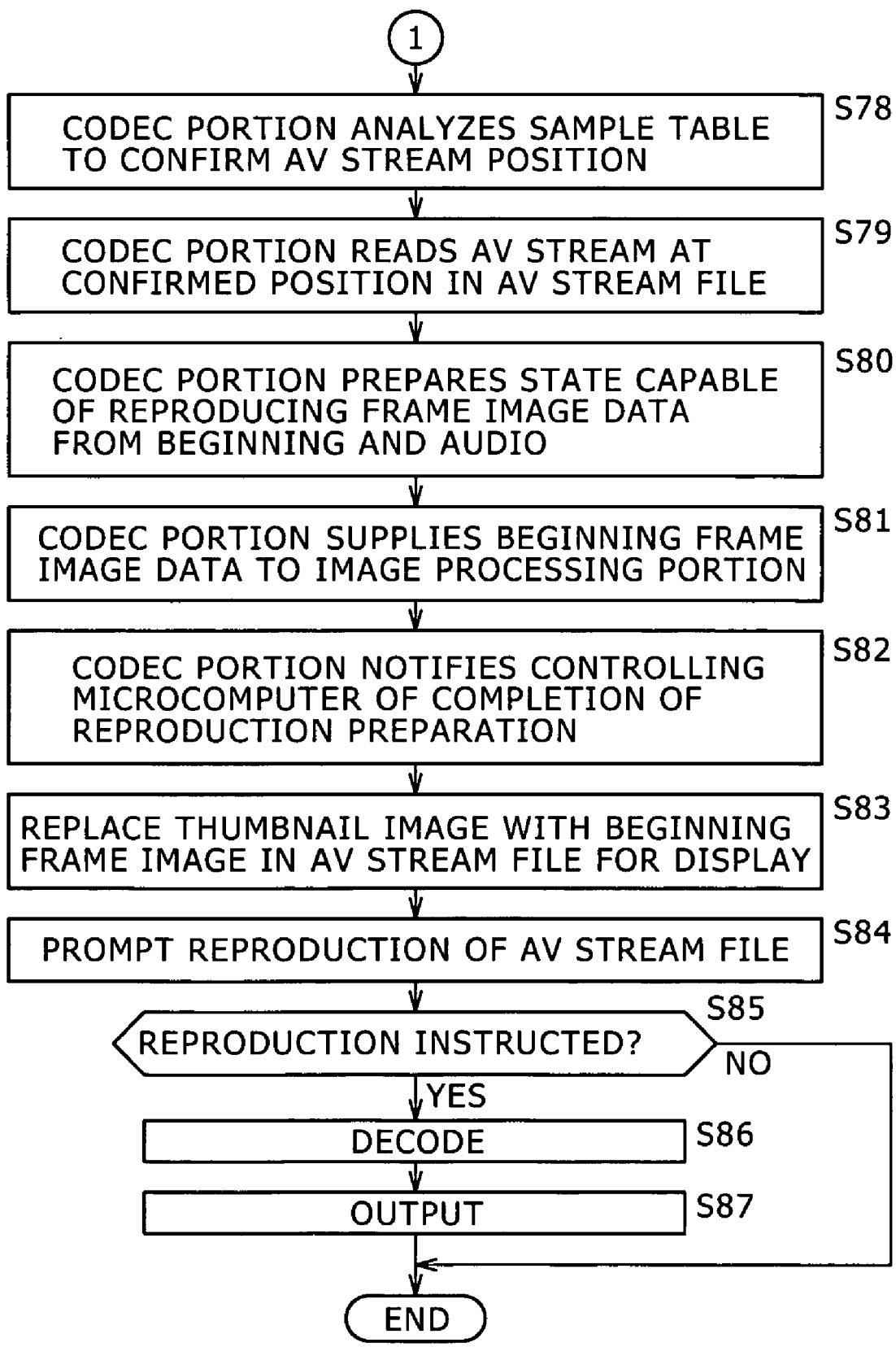
FIG. 14 is a flowchart showing a reproducing process in the recording and reproducing apparatus in FIG. 1.

A reproducing apparatus (e.g., the recording and reproducing apparatus 1 in FIG. 1) according to an embodiment of the present invention reproduces a recording medium (e.g., the MS 49 in FIG. 1) which records a moving picture file (e.g., an AV stream file) containing moving picture data and a thumbnail image file containing thumbnail image data associated with the moving picture file, the reproducing apparatus including:

a read portion (e.g., a reproducing process portion 164 of the controlling microcomputer 46 in FIG. 5) to read the moving picture file and the thumbnail image file associated with the moving picture file from the recording medium; and a display control portion (e.g., a display control portion 44 in FIG. 1) which controls a display portion so as to display a thumbnail image based on the thumbnail image file read by the read portion and a moving picture based on the moving picture file, wherein, when the moving picture file is selected, the read portion reads the thumbnail image file associated with the moving picture file (e.g., Step S72 in FIG. 13);

wherein the display control portion controls a display portion so as to display a thumbnail image based on the thumbnail image file read by the read portion (e.g., Step S74 in FIG. 13);

wherein the read portion further reads the moving picture file (e.g., Step S76 in FIG. 13,); and wherein, when the read portion has completed reading of a beginning frame in the moving picture file, the display control portion controls a display portion so as to display a moving picture based on the moving picture file instead of the thumbnail image displayed on the display portion (e.g., Step S83 in FIG. 14).

A reproducing apparatus according to an embodiment of the present invention includes:

a decompression portion (e.g., a compression process portion 143 in FIG. 4) to decompress compressed thumbnail image data for the thumbnail image file; and a decode portion (e.g., the decode process portion 123 in FIG. 3) to decode the encoded moving picture data for the moving picture file, wherein, when the moving picture file is selected, the read portion reads the thumbnail image file associated with the moving picture file (e.g., Step S72 in FIG. 13);

wherein the decompression portion decompresses compressed thumbnail image data for the thumbnail image file read by the read portion (e.g., Step S73 in FIG. 13);

wherein the display control portion controls a display portion so as to display a thumbnail image based on the thumbnail image data decompressed by the decompression portion (e.g., Step S74 in FIG. 13);

wherein the read portion further reads the moving picture file (e.g., Step S79 in FIG. 13);

wherein the decode portion decodes encoded moving picture data for the moving picture file read by the read portion (e.g., Step S80 in FIG. 14); and wherein, when the decode portion has completed decoding of the moving picture data, the display control portion controls a display portion so as to display a moving picture based on the moving picture data instead of the thumbnail image displayed on the display portion (e.g., Step S83 in FIG. 14).

The thumbnail image data for the reproducing apparatus according to an embodiment of the present invention corresponds to beginning frame image data in the moving picture file.

The thumbnail image data for the reproducing apparatus according to an embodiment of the present invention corresponds to beginning frame image data in the moving picture file.

There are further provided a decompression portion (e.g., the decompression process portion 143 in FIG. 4) to decompress compressed thumbnail image data for the thumbnail image file; and a decode portion (e.g., the decode process portion 123 in FIG. 3) to decode the encoded moving picture data for the moving picture file, wherein, when the moving picture file is selected, the read portion reads the thumbnail image file associated with the moving picture file (e.g., Step S72 in FIG. 13)

wherein the decompression portion decompresses compressed thumbnail image data for the thumbnail image file read by the read portion (e.g., Step S73 in FIG. 13);

wherein the display control portion controls a display portion so as to display a thumbnail image based on the thumbnail image data decompressed by the decompression portion (e.g., Step S74 in FIG. 13);

wherein the read portion further reads beginning frame image data in the moving picture file (e.g., Step S79 in FIG. 13);

wherein the decode portion decodes encoded beginning frame image data in the moving picture file read by the read portion (e.g., Step S80 in FIG. 14); and wherein, when the decode portion has completed decoding of the beginning frame image data, the display control portion controls the display portion so as to display an image based on the beginning frame image data instead of the thumbnail image displayed on the display portion (e.g., Step S83 in FIG. 14);

wherein, when the display control portion allows the display portion to display an image based on the beginning frame image data in the moving picture file and then commands reproduction of a moving picture file (e.g., determined to be YES at Step S85 in FIG. 14), the read portion sequentially reads second and later frame image data in the moving picture file;

wherein the decode portion sequentially decodes encoded second and later frame image data in the moving picture file read by the read portion (e.g., Step S86 in FIG. 14); and wherein the display control portion sequentially controls the display portion so as to display a moving picture based on second and later frame image data decoded by the decode portion in the moving picture file (e.g., Step S87 in FIG. 14).

An MP4 file format standard is used as a basis for encoding the moving picture data contained in the moving picture file recorded on the recording medium for the reproducing apparatus according to an embodiment of the present invention, wherein the decode portion decodes the-encoded moving picture data based on the MP4 file format standard.

A reproduction method according to an embodiment of the present invention is provided for a reproducing apparatus (e.g., the recording and reproducing apparatus 1 in FIG. 1) to reproduce a recording medium (e.g., the MS 49 in FIG. 1) which records a moving picture file (e.g., an AV stream file) composed of moving picture data and a thumbnail image file composed of thumbnail image data associated with the moving picture file, the method including:

a first read step of reading the thumbnail image file associated with the moving picture file, when selected, from the recording medium(e.g., Step S72 in FIG. 13);

a first display control step of controlling a display portion so as to display a thumbnail image based on the thumbnail image file read by a process at the first read step (e.g., Step S74 in FIG. 13);

a second read step of reading the moving picture file from the recording medium (e.g., Step S76 in FIG. 13); and a second display control step of, when a process at the second read step has completed reading of a beginning frame in the moving picture file, controlling the display portion so as to display a moving picture based on the moving picture file instead of the thumbnail image displayed on the display portion (e.g., Step S83 in FIG. 14).

A program according to an embodiment of the present invention controls processes to reproduce a recording medium (e.g., MS49 in FIG. 1) which records a moving picture file (e.g., an AV stream file) composed of moving picture data and a thumbnail image file composed of thumbnail image data associated with the moving picture file, and allows a computer to perform a process including:

a first read step of reading the thumbnail image file associated with the moving picture file, when selected, from the recording medium (e.g., Step S72 in FIG. 13);

a first display control step of controlling a display portion so as to display a thumbnail image based on the thumbnail image file read by a process at the first read step (e.g., Step S74 in FIG. 13);

a second read step of reading the moving picture file from the recording medium (e.g., Step S76 in FIG. 13); and a second display control step of, when a process at the second read step has completed reading of a beginning frame in the moving picture file, controlling the display portion so as to display a moving picture based on the moving picture file instead of the thumbnail image displayed on the display portion (e.g., Step S83 in FIG. 14).

Embodiments of the present invention will be described in further detail with reference to the accompanying drawings.

Figure 1:
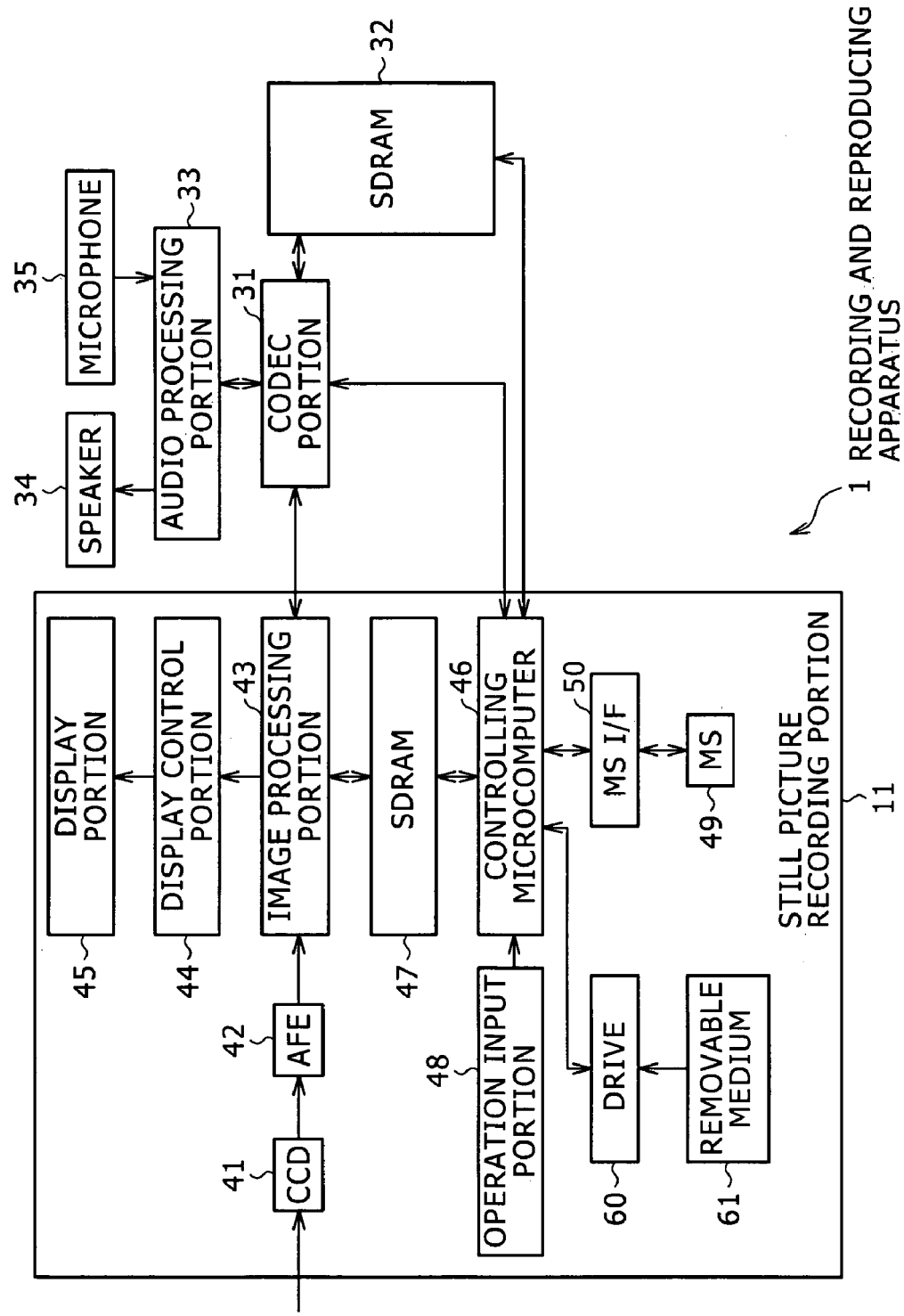
FIG. 1 is a block diagram exemplifying the configuration of a recording and reproducing apparatus according to the present invention.

FIG. 1 exemplifies the configuration of a recording and reproducing apparatus 1 according to the present invention.

The recording apparatus 1 is provided with a still picture recording portion 11, a CODEC portion 31, SDRAM 32, an audio processing portion 33, a speaker 34, and a microphone 35.

The CODEC portion 31 performs a CODEC process for image (moving picture) data and audio data. For example, the CODEC portion 31 encodes moving picture data based on the MP4 file format standard and synthesizes the encoded moving picture data with AAC (Advanced Audio Coding) encoded audio data to generate an AV stream. The CODEC portion 31 decodes moving picture data encoded based on the MP4 file format standard, for example. The CODEC portion 31 performs a mux process (a so-called interleave process) and a demux process (a so-called deinterleave process). The CODEC portion 31 reduces images. The CODEC portion 31 stores data to or reads data from the SDRAM 32 as needed. The MP4 file format signifies an interleaved form of encoded image data and audio data or its sample table form.

The SDRAM 32 stores data needed for the CODEC portion 31 to perform various processes. The SDRAM 32 reads and writes data based on instructions from the still picture recording portion 11 and the CODEC portion 31. For example, the SDRAM 32 temporarily stores encoded moving picture data and audio data (encoded by the audio processing portion 33 according to AAC (Advanced Audio Coding)). Although not shown, the DMA transfer is performed from the SDRAM 32 to MS 49 under control of a DMAC (Direct Memory Access controller).

The audio processing portion 33 performs processes associated with audio data. For example, the audio processing portion 33 applies various processes to audio data supplied from the CODEC portion 31 and allows the speaker 34 to output audio based on the audio data. The audio processing portion 33 applies various processes to audio data supplied from the microphone 35 and supplies the audio data to the CODEC portion 31. For example, the audio processing portion 33 AAC-encodes audio data and decodes encoded audio data. The speaker 34 outputs audio based on the audio data supplied from the audio processing portion 33. The microphone 35 incorporates audio data based on external audio and supplies the audio data to the audio processing portion 33.

The still picture recording portion 11 is provided with a CCD (Charge Coupled Device) 41, an AFE (Analog Front End) 42, an image processing portion 43, a display control portion 44, a display portion 45, a controlling microcomputer 46, SDRAM 47, an operation input portion 48, MS (MemoryStick (registered trademark) 49, an MS I/F (interface) drive 60, and a removable medium 61.

The CCD 41 is an imaging element. According to the photoelectric conversion, the CCD 41 converts incident light into an electric signal represented by a voltage value corresponding to each pixel and stores the signal. The CCD 41 outputs the electric signal as an image signal to an AFE (Analog Front End) 42. The AFE 42 amplifies a pixel-based level of the image signal supplied from the CCD 41 up to a specified level and performs A/D (analog/digital) conversion. The AFE 42 supplies the image data converted into digital data to the image processing portion 43.

The image processing portion 43 performs an image process based on the input image data. The image processing portion 43 is connected to a display control portion 44, the CODEC portion 31, and the SDRAM 47. For example, the image processing portion 43 supplies the display control portion 44 with image data to be displayed on the display portion 45 and interchanges image data with the SDRAM 47. The image processing portion 43 supplies the CODEC portion 31 with image data (moving picture data) and receives image data (moving picture data) supplied from the CODEC portion 31. The image processing portion 43 compresses and decompresses a still picture (frame image). The SDRAM 47 accordingly stores data needed for the image processing portion 43 and the controlling microcomputer 46 to perform various processes.

The controlling microcomputer 46 controls the respective portions of the recording and reproducing apparatus 1. The controlling microcomputer 46 controls recording or reading (reproduction) from the MS 49 via the MS I/F 50. The controlling microcomputer 46 contains a CPU, ROM, RAM, a buffer, and the like. The controlling microcomputer 46 controls storage or reading (reproduction) of data from the SDRAM 32 and the SDRAM 47. The controlling microcomputer 46 controls the respective portions based on control signals supplied from the operation input portion 48. The controlling microcomputer 46 commands the CODEC portion 31 to perform various processes. The controlling microcomputer 46 connects with a drive 60 as needed. The drive 60 is appropriately mounted with a removable medium 61 such as a magnetic disk, an optical disk, an magnetic optical disk, or semiconductor memory. A computer program is read from the removable medium 61 and is installed on the controlling microcomputer 46 as needed.

The MS I/F 50 provides an interface between the controlling microcomputer 46 and the MS 49. The MS I/F 50 interfaces recording and reproducing processes with the MS 49.

The recording and reproducing apparatus 1 in FIG. 1 enables only the still picture recording portion 11 to record and reproduce still pictures.

To record a moving picture, the CCD 41 captures an image signal. The AFE 42 converts this image signal into digital image data that is then supplied to the image processing portion 43. The image processing portion 43 supplies the image data to the CODEC portion 31. The moving picture data is composed of multiple pieces of still picture data (multiple pieces of frame image data). The CODEC portion 31 properly stores the moving picture data in the SDRAM 32. In addition, the CODEC portion 31 generates an AV stream based on the moving picture data and the encoded audio data supplied from the audio processing portion 33. The CODEC portion 31 supplies the AV stream to the controlling microcomputer 46. The controlling microcomputer 46 records an AV stream file in the MS 49 via the MS I/F 50.

To reproduce the AV stream file, the controlling microcomputer 46 reads the AV stream recorded (encoded) in the MS 49 via the MS I/F 50 and temporarily stores the AV stream in the SDRAM 32. The CODEC portion 31 successively decodes AV streams stored in the SDRAM 32 and supplies the image processing portion 43 with moving picture data resulting from the decoding. The CODEC portion 31 also supplies the encoded audio data to the audio processing portion 33 for decoding. The image processing portion 43 successively supplies the display control portion 44 with the moving picture data supplied from the CODEC portion 31. The display control portion 44 provides display control so as to display an image based on the supplied moving picture data on the display portion 45.

Figure 2:
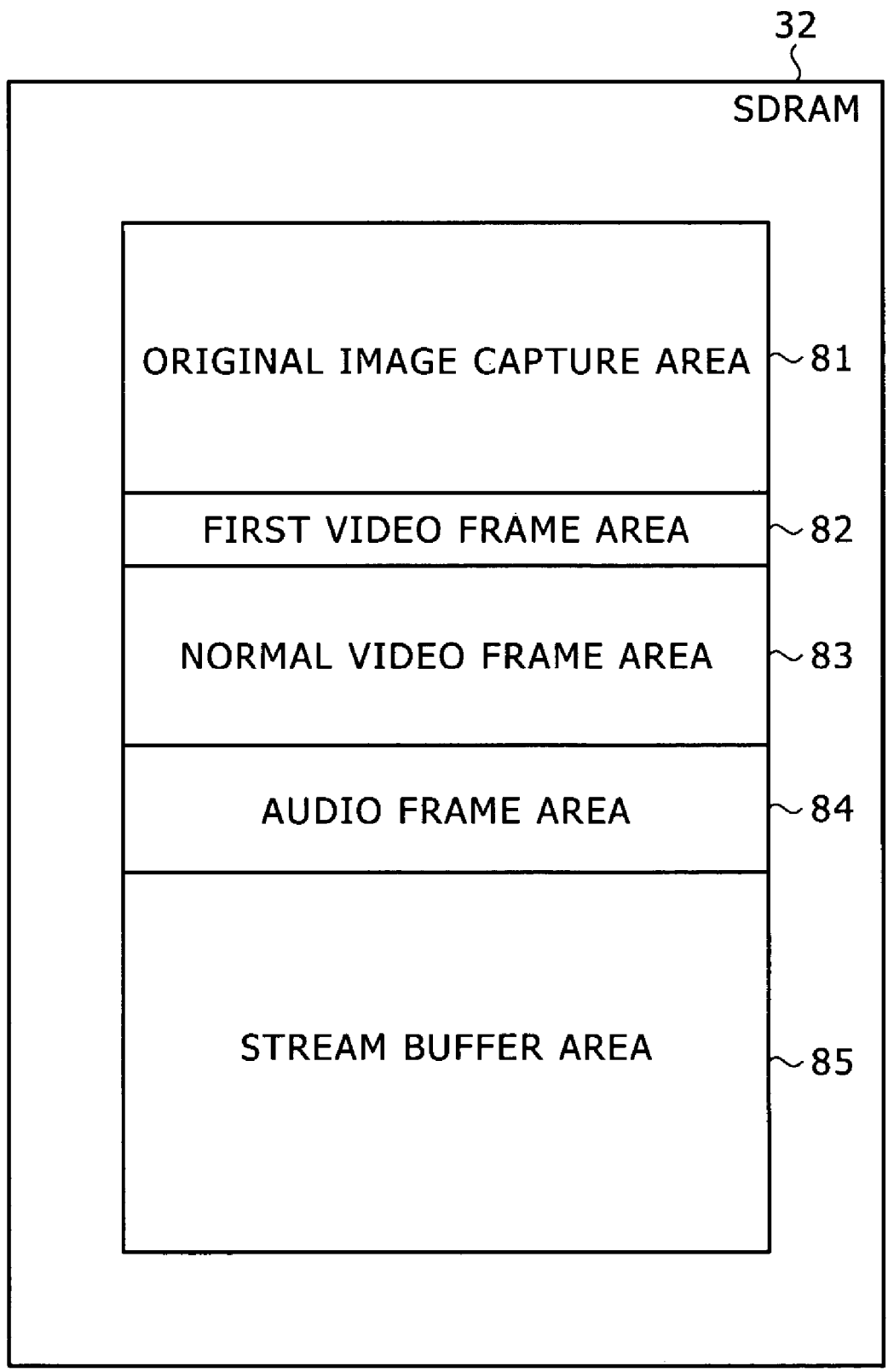
FIG. 2 diagrams storage areas of SDRAM in FIG. 1.

FIG. 2 diagrams storage areas of the SDRAM 32 in FIG. 1.

The SDRAM 32 is provided with storage areas (storage regions) such as an original image capture area 81, a first video frame area 82, a normal video frame area 83, an audio frame area 84, and a stream buffer area 85. Actually, there are provided areas for storing the other data. The embodiment omits these areas.

The original image capture area 81 stores an original image (frame image) captured by the CODEC portion 31 and a decoded original frame image data (original image). The first video frame area 82 stores beginning frame image data during a recording process, i.e., image data for the first frame in the moving picture data. The normal video frame area 83 stores encoded moving picture data, i.e., normally encoded frame image data. The audio frame area 84 stores AAC-encoded audio data. The stream buffer area 85 stores an AV stream composed of image data (video data) and audio data interleaved with each other, i.e., an AV stream composed of muxed image data and audio data. Further, the stream buffer area 85 stores a sample table and the other types of data.

In this manner, the SDRAM 32 is provided with the areas for storing multiple types of data.

Referring now to FIG. 3, the following describes a functional configuration example of the CODEC portion 31 in FIG. 1.

The CODEC portion 31 is provided with a capture process portion 121, an encode process portion 122, a decode process portion 123, a mux process portion 124, a demux process portion 125, a recording process portion 126, a reproduction process portion 127, a reduction process portion 128, and an output process portion 129. Data can be interchanged between these portions inside the CODEC portion 31.

The capture process portion 121 performs a capture process based on moving picture data supplied from the image processing portion 43. Specifically, the capture process portion 121 successively captures frame images from the moving picture based on the moving picture data supplied from the image processing portion 43. The capture process portion 121 successively writes (stores) frame image data for the captured frame images to the original image capture area 81 in the SDRAM 32. A moving picture is composed of multiple frame images. The moving picture data is composed of multiple pieces of frame image data equivalent to image data for multiple frames.

The encode process portion 122 performs a process (encode process) to encode image data based on the MP4 file format standard. Specifically, the encode process portion 122 successively reads frame image data written in the original image capture area 81 of the SDRAM 32 and encodes the frame image data based on the MP4 file format standard. The encode process portion 122 writes the encoded frame image data to the normal video frame area 83 of the SDRAM 32. When the encoded frame image data corresponds to a beginning frame image in the recording process, the encode process portion 122 writes the encoded frame image data to the first video frame area 82 of the SDRAM 32.

The decode process portion 122 performs a process (decode process) to decode encoded image data based on the MP4 file format standard. The decode process portion 122 decodes moving picture data, i.e., encoded frame image data (multiple pieces of frame image data) written in the normal video frame area 83 of the SDRAM 32. The decode process portion 122 successively writes the decoded frame image data to the original image capture area 81 of the SDRAM 32. The decode process portion 122 decodes the encoded frame image data (first frame image data in the moving picture data) written to the first video frame area 82 of the SDRAM 32.

The mux process portion 124 interleaves (muxes) frame image data and audio data. The mux process portion 124 writes the interleaved frame image data and audio data as a single AV stream (a stream according to the MP4 file format) to the stream buffer area 85 of the SDRAM 32. That is, frame image data is encrypted according to the MP4 file format. Audio data is encrypted according to the AAC system. The encrypted frame image data and audio data are interleaved to generate a stream (AV stream) according to the MP4 file format.

The demux process portion 125 deinterleaves (demuxes) the interleaved (muxed) AV stream into the frame image data and the audio data. Of the deinterleaved frame image data and audio data, the demux process portion 125 writes the frame image data to the normal video frame area 83 of the SDRAM 32 and writes the audio data to the audio frame area 84 thereof.

The stream buffer area 85 of the SDRAM 32 stores the AV stream (the stream composed of frame image data and audio data) The recording process portion 126 performs a process to record the AV stream as an AV stream file on the MS 49 as a recording medium. Specifically, the recording process portion 126 reads the AV stream written to the stream buffer area 85 and supplies the AV stream to the controlling microcomputer 46. The controlling microcomputer 46 controls recording on the MS 49 so as to record the AV stream as a stream file in the MS 49.

The reproducing process portion 127 performs a process to reproduce the stream file recorded in the MS 49. Specifically, the controlling microcomputer 46 reads the stream file from the MS 49 and supplies the stream file to the reproducing process portion 127. The reproducing process portion 127 writes data of the stream file to the stream buffer area 85 of the SDRAM 32.

The reduction process portion 128 performs a process (reduction process) to reduce an image and generates a thumbnail image. Specifically, the reduction process portion 128 performs a process to reduce the image for the first decoded frame image data and generate a thumbnail image. For example, the reduction process portion 128 reduces the first frame image data that is read from the first video frame area 82 of the SDRAM 32 and is decoded by the decode process portion 122. The reduction process portion 128 reduces a decoded image of 640 by 480 pixels to an image of 160 by 120 pixels to generate a thumbnail image, for example.

The output process portion 129 performs a process to output image data and audio data. For example, the original image capture area 81 of the SDRAM 32 stores frame image data (moving picture data composed of multiple pieces of frame image data) to be reproduced. The output process portion 129 outputs this frame image data to the image processing portion 43. The audio frame area 84 of the SDRAM 32 stores audio data to be reproduced. The output process portion 129 outputs this audio data to the audio processing portion 33.

FIG. 4 is a block diagram exemplifying the functional configuration of the image processing portion 43 in FIG. 1.

According to the example in FIG. 4, the image processing portion 43 is provided with a main control portion 141, a compression process portion 142, and a decompression process portion 143. Data can be interchanged between these portions inside the image processing portion 43.

The main control portion 141 controls the compression process portion 142 and the decompression process portion 143. The main control portion 141 controls storage on the SDRAM 47 and controls the display control portion 47. Further, the main control portion 141 supplies the CODEC portion 31 with moving picture data supplied from the AFE 42.

The compression process portion 142 compresses image data. For example, the compression process portion 142 compresses images based on the JPEG (Joint Photographic Expert Group) format. The compression process portion 142 temporarily stores the compressed image data in the SDRAM 47, for example. The decompression process portion 143 decompresses the compressed image data. For example, the decompression process portion 143 decompresses a JPEG compressed image to generate display image (original image).

FIG. 5 is a block diagram exemplifying the functional configuration of the controlling microcomputer 46 in FIG. 1.

According to the example in FIG. 5, the controlling microcomputer 46 is provided with a main control portion 161, a transfer process portion 162, a thumbnail image recording process portion 163, and a reproducing process portion 164. Data can be interchanged between these portions inside the controlling microcomputer 46.

The main control portion 161 controls the transfer process portion 162, the thumbnail image recording process portion 163, and the reproducing process portion 164. The main control portion 161 controls storage to the SDRAM 32 and the SDRAM 47 and performs a process based on a control signal supplied from the operation input portion 48. The main control portion 161 also controls the CODEC portion 31.

The transfer process portion 162 performs a process to read data from the SDRAM 32 and transfer the read data to the SDRAM 47. For example, the transfer process portion 162 transfers thumbnail image data stored in the stream buffer area 85 of the SDRAM 32 to the SDRAM 47.

The thumbnail image recording process portion 163 controls a process to record a thumbnail image on the MS 49. For example, the thumbnail image recording process portion 163 reads a thumbnail image stored in the SDRAM 47 and controls recording on the MS 49 via the MS I/F 50.

The reproducing process portion 164 performs a process to reproduce (read) data recorded in the MS 49. Specifically, the reproducing process portion 164 reads data recorded in the MS 49 via the MS I/F 50.

FIG. 6 concisely illustrates a stream file (a file of AV streams) format based on the MP4 file format standard.

As shown in FIG. 6, a stream file based on the MP4 file format standard contains a header, an AV stream (mdat), and a sample table (MOOV). To reproduce this stream file, the sample table (MOOV) is first read and analyzed to confirm the order of frames in the AV stream (AVI). The AV stream is read in the order of frames confirmed with reference to the sample table. That is, such standard first specifies reading of the sample table, and then confirms the position of the first frame image data to read the first frame image data.

Figure 7:
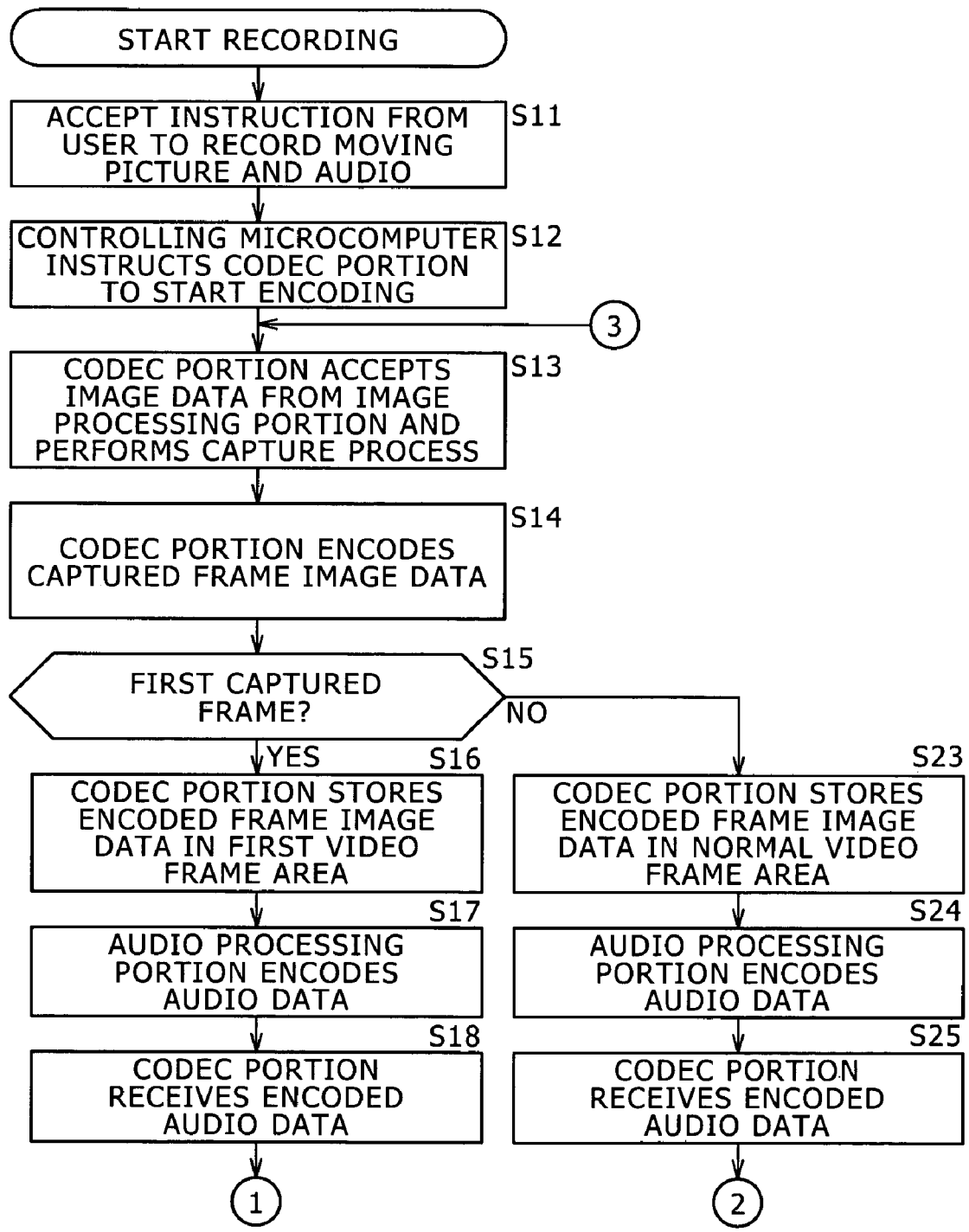
FIG. 7 is a flowchart showing a recording process in the recording and reproducing apparatus in FIG. 1.
Figure 10:
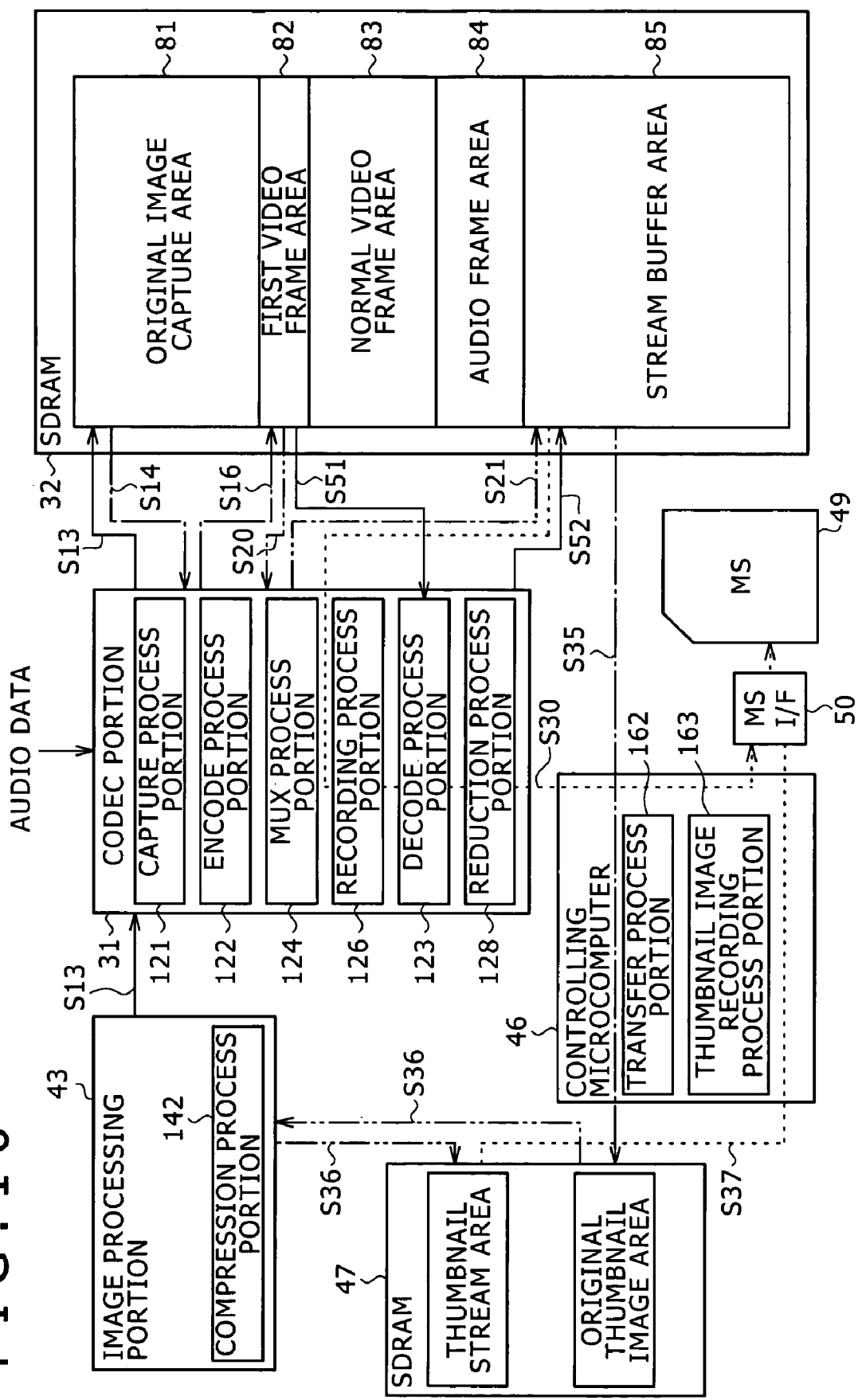
FIG. 10 shows a flow of first frame image data in the recording process.
Figure 11:
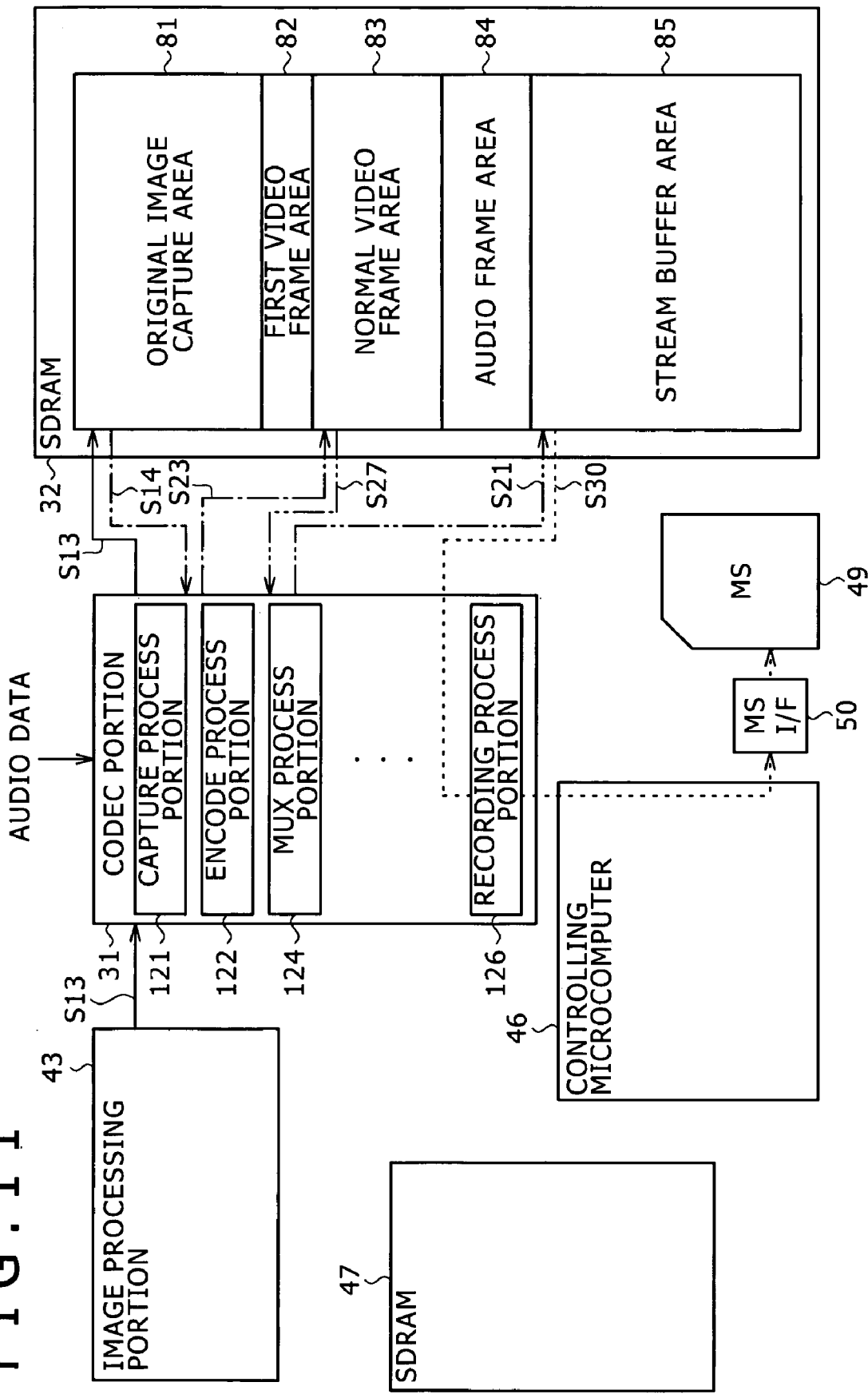
FIG. 11 shows a flow of moving picture data except the first frame image data in the recording process.

Referring now to flowcharts in FIGS. 7 through 9, the following describes an example of the recording process in the recording and reproducing apparatus 1 of FIG. 1. This process starts when a user uses the operation input portion 48 of the recording and reproducing apparatus 1 to issue an instruction to record moving picture data (and audio data). For example, the process starts when the user presses a release button in a moving picture recording mode. FIGS. 10 and 11 are referenced to describe the process flow as needed.

FIG. 10 shows a flow of the first frame image data contained in moving picture data when an AV stream is to be recorded. FIG. 11 shows a flow of the first frame image data except the first frame image data when an AV stream is to be recorded. FIGS. 10 and 11 appropriately show necessary ones of the above-mentioned function blocks of the CODEC portion 31, the image processing portion 43, and the controlling microcomputer 46 as shown in FIGS. 3 through 5. In FIGS. 10 and 11, arrows with step numbers correspond to steps of the process as shown in FIGS. 7 through 9.

At Step S11, the operation input portion 48 accepts an instruction from the user to record a moving picture and audio (AV stream). The operation input portion 48 supplies the controlling microcomputer 46 with a control signal corresponding to this instruction.

At Step S12, the controlling microcomputer 46 (the main control portion 161 of the controlling microcomputer 46 (FIG. 5)) instructs the CODEC portion 31 to start encoding. At this time, the controlling microcomputer 46 allows the CCD 41 to start imaging and allows the audio processing portion 33 to receive audio using the microphone 35. The CCD 41 allows the AFE 42 to successively supply the image processing portion 43 with image signals (as moving picture data) obtained by imaging.

At Step S13, the CODEC portion 31 accepts the image data supplied from the image processing portion 43 and performs a capture process. Specifically, the capture process portion 121 (FIG. 3) of the CODEC portion 31 captures a frame image from the image data (moving picture data) supplied from the image processing portion 43 and writes the frame image to the original image capture area 81 (FIG. 2) of the SDRAM 32. The first process at Step S13 captures the first frame image data as indicated by an arrow corresponding to Step S13 in FIG. 10, for example.

At Step S14, the CODEC portion 31 encodes the captured frame image data based on the MP4 file format standard. Specifically, the encode process portion 122 (FIG. 3) of the CODEC portion 31 reads frame image data from the original image capture area 81 of the SDRAM 32 that stores the captured frame image data (an arrow for Step S14 in FIG. 10). The encode process portion 122 encodes the frame image data based on the MP4 file format standard.

At Step S15, the encode process portion 122 of the CODEC portion 31 determines whether or not the most recently encoded frame image data is the first captured frame image data. Specifically, when the process is first performed at Step S15 after the recording instruction at Step S11 in FIG. 5 starts, the encoded frame image data is determined to be the first captured frame image data (the first frame image data). When the process is performed second or later at Step S15, the encoded frame image data is not determined to be the first captured frame image data (i.e., determined to be the second or later frame image data). In this manner, the frame image data first captured in the recording process becomes the first frame image data.

At Step S15, the most recently encoded frame image data may be determined to be the first captured frame image data. In this case, at Step S16, the CODEC portion 31 stores (writes) the encoded frame image data in the first video frame area 82 (FIG. 2) of the SDRAM 32. Specifically, the encoded frame image data is the first captured frame image data. That is, the encoded frame image data is the first frame image data in the moving picture data recording. Accordingly, the encode process portion 122 of the CODEC portion 31 stores (writes) the frame image data in the first video frame area 82 of the SDRAM 32. As indicated by an arrow corresponding to Step S16 in FIG. 10, the first video frame area 82 stores the first frame image data.

At Step S17, the audio processing portion 33 encodes audio data captured from the microphone 35 based on the AAC standard. The audio processing portion 33 supplies the encoded audio data to the CODEC portion 31.

At Step S18, the CODEC portion 31 receives the encoded audio data supplied from the audio processing portion 33.

At Step S19, the CODEC portion 31 stores (writes) the encoded audio data in the audio frame area 84 of the SDRAM 32.

At Step S20, the CODEC portion 31 interleaves the frame image data in the first video frame area 82 of the SDRAM 32 with the audio data in the audio frame area 84 of the SDRAM 32. Specifically, the first video frame area 82 of the SDRAM 32 stores the frame image data (the first frame image data). The audio frame area 84 of the SDRAM 32 stores the audio data (audio data with the timing corresponding to the first frame image data) The mux process portion 124 (FIG. 3) of the CODEC portion 31 interleaves the frame image data with the audio data. As indicated by an arrow corresponding to Step S20 in FIG. 10, the first frame image data is read from the first video frame area 82 of the SDRAM 32. The process at Step S20 performs the interleave to generate an AV stream as a result.

After Step S20, the process proceeds to Step S21. The CODEC portion 31 stores the interleaved and generated AV stream in the stream buffer area 85 of the SDRAM 32. Specifically, the mux process portion 124 of the CODEC portion 31 writes the interleaved and generated AV stream to the stream buffer area 85 of the SDRAM 32 (an arrow corresponding to Step S21 in FIG. 10).

At Step S22, the CODEC portion 31 determines whether or not the stream buffer area 85 of the SDRAM 32 stores a specified amount of data. Specifically, the recording process portion 126 of the CODEC portion 31 determines whether or not the stream buffer area 85 of the SDRAM 32 stores a specified amount of data (the amount of data equivalent to a specified recording unit) At Step S22 for the first process, the stream buffer area 85 stores the first frame image data (encoded) and the corresponding audio data (encoded) interleaved with each other. The determination is based on this state.

At Step S22, it may be determined that the stream buffer area 85 of the SDRAM 32 does not store the specified amount of data. In this case, the process returns to Step S13 and is repeated thereafter. That is, the process is repeated until the specified amount of data is stored in the stream buffer area 85 of the SDRAM 32.

Specifically, at Step S13, the second-process accepts new moving picture data to capture the second frame image. This image is written to the original image capture area 81 (FIG. 2) of the SDRAM 32 (an arrow corresponding to Step S13 in FIG. 11). At Step S14, the encode process portion 122 of the CODEC portion 31 reads the frame image data from the original image capture area 81 of the SDRAM 32 (an arrow corresponding to Step S14 in FIG. 11) and encodes that data based on the MP4 file format standard. At Step S15, the encode process portion 122 of the CODEC portion 31 determines whether or not the most recently encoded frame image data is the first captured frame image data. The determination is negative because the data corresponds to the second frame image. The process proceeds to Step S23.

At Step S23, the CODEC portion 31 stores the encoded frame image data in the normal video frame area 83 of the SDRAM 32 (an arrow corresponding to Step S23 in FIG. 11). Specifically, the encoded frame image data is the second one or later, i.e., not the first frame image data. Consequently, the encode process portion 122 (FIG. 3) of the CODEC portion 31 stores this frame image data in the normal video frame area 83 of the SDRAM 32. In this manner, the first video frame area 82 of the SDRAM 32 stores only the first frame image data out of the moving picture data. The normal video frame area 83 of the SDRAM 32 stores the remaining moving picture data except the first frame image data.

At Step S24, the audio processing portion 33 ACC-encodes audio data captured from the microphone 35. The audio processing portion 33 supplies the encoded audio data to the CODEC portion 31.

At Step S25, the CODEC portion 31 receives the encoded audio data supplied from the audio processing portion 33.

At Step S26, the CODEC portion 31 stores (writes) the encoded audio data in the audio frame area 84 of the SDRAM 32.

At Step S27, the CODEC portion 31 interleaves the frame image data in the normal video frame area 83 of the SDRAM 32 with the audio data in the audio frame, area 84 of the SDRAM 32. Specifically, the normal video frame area 83 of the SDRAM 32 stores the frame image data (the second frame image data in this example). The audio frame area 84 of the SDRAM 32 stores the audio data (audio data having the timing corresponding to the second frame image data in this example). The mux process portion 124 (FIG. 3) of the CODEC portion 31 interleaves the frame image data with the audio data to generate an AV stream. As indicated by an arrow corresponding to Step S27 in FIG. 11, the second (or later) frame image data is read from the normal video frame area 83 of the SDRAM 32.

After Step S27, the process proceeds to Step S21. The CODEC portion 31 stores the interleaved AV stream in the stream buffer area 85 of the SDRAM 32 (an arrow corresponding to Step S21 in FIG. 11). Specifically, the mux process portion 124 of the CODEC portion 31 writes the interleaved AV stream to the stream buffer area 85 of the SDRAM 32.

At Step S22, the CODEC portion 31 determines whether or not the stream buffer area 85 of the SDRAM 32 stores a specified amount of data. Specifically, the recording process portion 126 of the CODEC portion 31 determines whether or not the stream buffer area 85 of the SDRAM 32 stores a specified amount of data (the amount of data equivalent to a specified recording unit). At Step S22 for the second process, the stream buffer area 85 stores an AV stream composed of the first frame image data (encoded), the second frame image data (encoded), and the corresponding audio data (encoded) all interleaved with each other. That is, repeating the process at Step S21 accumulates AV streams in the stream buffer area 85 of the SDRAM 32.

At Step S22, it may be determined that the stream buffer area 85 of the SDRAM 32 stores the specified amount of data. In this case, the process proceeds to Step S28. At Step S28, the CODEC portion 31 (the recording process portion 126 of the CODEC portion 31) notifies the controlling microcomputer 46 that the stream buffer area 85 of the SDRAM 32 stores the AV stream equivalent to the specified amount of data.

At Step S29, the CODEC portion 31 (the recording process portion 126 of the CODEC portion 31) supplies the controlling microcomputer 46 with the AV stream stored in the stream buffer area 85 of the SDRAM 32.

At Step S30, the controlling microcomputer 46 records the AV stream in the MS 49. Specifically, the main control portion 161 of the controlling microcomputer 46 records the AV stream read from the stream buffer area 85 in the MS 49 via the MS I/F 50. At this time, the AV stream is recorded as an AV stream file. Let us suppose that the AV stream file is named "ABC1.mp4." In this file name, "mp" to the right of the comma signifies an extension. In this example, the stream buffer area 85 contains at least the first and second frame image data. The controlling microcomputer 46 records these pieces of data as an AV stream in the MS 49. The second and later frame image data are additionally recorded in the same file (ABC1.mp4). All frame image data contained in the AV stream file are transferred along a route indicated by an arrow corresponding to Step S30 in FIG. 11.

At Step S31, the controlling microcomputer 46 determines whether or not to terminate the recording process. Specifically, the main control portion 161 of he controlling microcomputer 46 determines whether or not a user uses the operation input portion 48 to issue an instruction to terminate the recording process. When the recording process is determined not to terminate, the process returns to Step S13 and is repeated thereafter. That is, AV streams are recorded successively.

When the recording process is determined to terminate Step S31, the controlling microcomputer 46, at Step S32, commands the CODEC portion 31 to generate a thumbnail image. Specifically, the main control portion 161 of the controlling microcomputer 46 commands the CODEC portion 31 to generate a thumbnail image. That is, the controlling microcomputer 46 terminates recording of an ordinary AV stream in the MS 49, and then commands generation of the thumbnail image. This prevents coincidence of timings to record an AV stream and to generate a thumbnail image.

At Step S33, the CODEC portion 31 performs a thumbnail image generation process. Specifically, the CODEC portion 31 generates a thumbnail image and stores data (thumbnail image data) for the generated thumbnail image in the stream buffer area 85 of the SDRAM 32. This process will be described in detail with reference to a flowchart in FIG. 12. When completing the generation of the thumbnail image according to the process at Step S33, the CODEC portion 31 issues thumbnail completion notification to the controlling microcomputer 46.

At Step S34, the controlling microcomputer 46 accepts the thumbnail completion notification from the CODEC portion 31. At Step S35, the controlling microcomputer 46 copies the thumbnail image data from the stream buffer area 85 of the SDRAM 32 to the SDRAM 47. Specifically, the transfer process portion 162 of the controlling microcomputer 46 reads the thumbnail image data stored in the stream buffer area 85 of the SDRAM 32 and stores this data in the SDRAM 47. According to the example in FIG. 10, the transfer process portion 162 stores the thumbnail image data in a original thumbnail image area of the SDRAM 47.

At Step S36, the image processing portion 43 compresses the thumbnail image data stored in the original thumbnail image area of the SDRAM 47 to the JPEG format. Specifically, the compression process portion 142 of the image processing portion 43 compresses the thumbnail image data stored in the original thumbnail image area of the SDRAM 47 according to the JPEG format and stores the compressed thumbnail image data in a thumbnail stream area of the SDRAM 47. The image processing portion 43 originally has a JPEG format compression function to generate still picture files. This function can be used for the process at Step S36 to compress the thumbnail image data.

At Step S37, the controlling microcomputer 46 records the JPEG compressed thumbnail image data in the MS 49 as a file (JPEG file) having the same file name as the AV stream file with the extension "THM." Specifically, the thumbnail stream area (FIG. 10) of the SDRAM 47 stores JPEG compressed thumbnail image data. The thumbnail image recording process portion 163 of the controlling microcomputer 46 records this thumbnail image data in the MS 49 via the MS I/F 50 (an arrow corresponding to Step S37 in FIG. 10). The thumbnail image data is recorded as a file having the same file name as the AV stream file "ABC1.mp4" with the extension "THM", i.e., as the file named "ABC1.THM" in this example. In the following description, a file of thumbnail image data to be recorded is referred to as a thumbnail image file. After Step S37, the process terminates.

The processes in FIGS. 7 through 9 can be used to record a JPEG file of thumbnail image data as well as the AV stream file in the MS 49. The AV stream file and the thumbnail image file use the same name except the extensions. This can clarify the association between the AV stream file and the thumbnail image file. Further, it is possible to record the AV stream file and the thumbnail image file associated with each other. The first video frame area 82 of the SDRAM 32 temporarily stores the first frame image in the moving picture data, i.e., the frame image data for the first frame image during reproduction of the AV stream file. Accordingly, the frame image data for the first image can be easily read to generate a thumbnail image.

Referring now to a flowchart in FIG. 12, the following describes in detail the thumbnail image generation process at Step S33 in FIG. 9.

At Step S51, the decode process portion 123 of the CODEC portion 31 reads to decode the frame image data in the first video frame area 82 of the SDRAM 32. In this example, the first video frame area 82 of the SDRAM 32 stores the first frame image data in the moving picture data. The decode process portion 123 of the CODEC portion 31 reads the first frame image data stored in the first video frame area 82 of the SDRAM 32 and decodes this data. This process is equivalent to an arrow corresponding to Step S51 in FIG. 10.

At Step S52, the reduction process portion 128 of the CODEC portion 31 reduces the decoded frame image data to a size same as that of the thumbnail image for the still picture. For example, the reduction 128 of the CODEC portion 31 reduces the frame image data (640 by 480 pixels) decoded by the process at Step S51 to an image size (160 by 120 pixels) same as that of the thumbnail image for the still picture. The reduced, data is used as thumbnail image data.

At Step S53, the reduction process portion 128 of the CODEC portion 31 stores the thumbnail image data in the stream buffer area 85 of the SDRAM 32. This process is equivalent to an arrow corresponding to Step S53 in FIG. 10.

At Step S54, the reduction process portion 128 of the CODEC portion 31 notifies the controlling microcomputer 46 of completion of the thumbnail generation. Thereafter, the process returns to Step S33 in FIG. 9.

When the first video frame area 82 of the SDRAM 32 stores frame image data (the first frame image data in this example) that is encoded based on the MP4 file format standard, the process in FIG. 12 can decode and reduce the frame image data to generate thumbnail image data.

The following describes an example of reproducing an AV stream file with reference to flowcharts in FIGS. 13 and 14. The reproducing process starts when the MS 49 records the AV stream file and its associated (corresponding) thumbnail image file. That is, this process is performed after the processes as described with reference to FIGS. 7 through 9 and 12. The process starts when a user specifies selection of an AV stream file (selection of a moving picture file). For example, the process starts when the user issues an instruction to display multiple still pictures and the AV stream file recorded in the MS 49 by sequentially advancing the first image on a frame basis and the display instruction is issued to the AV stream file. That is, the process starts when an instruction is issued to display a preview image (the first frame image) for the AV stream file. The process flow will be described with reference to FIGS. 15 and 16 as needed.

Figure 15:
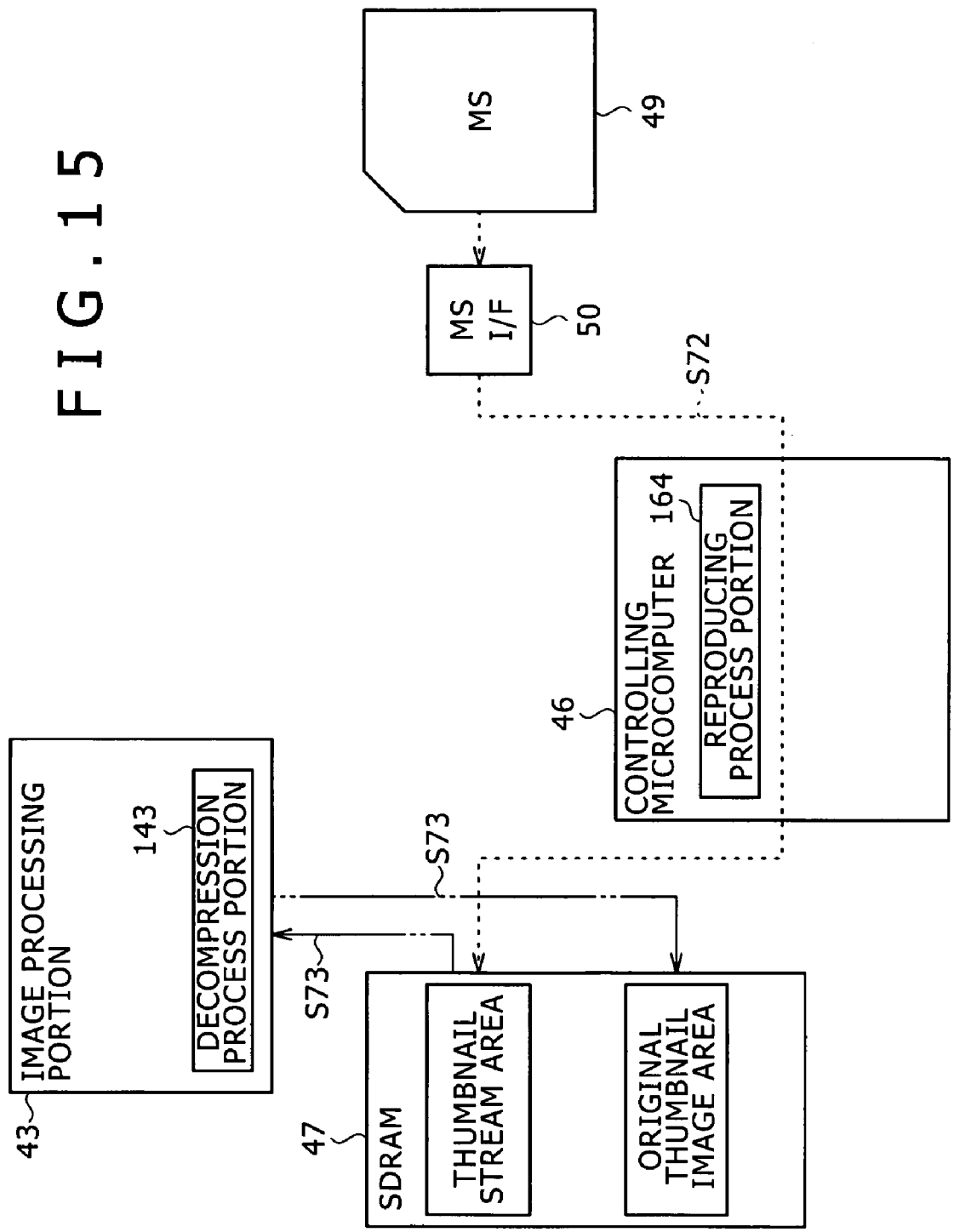
FIG. 15 shows a flow of thumbnail image data in the reproducing process.

FIG. 15 shows a flow of data for the thumbnail image file corresponding to the AV stream file recorded in the MS 49. FIG. 16 shows a flow of data for displaying the first frame image data in the AV stream file recorded in the MS 49 (actually, the same flow applies to not only the first frame image data, but also the remaining frame image data). FIGS. 15 and 16 appropriately show necessary ones of the above-mentioned function blocks of the CODEC portion 31, the image processing portion 43, and the controlling microcomputer 46 as shown in FIGS. 3 through 5. In FIGS. 15 and 16, arrows with step numbers correspond to steps of the process as shown in FIGS. 13 through 14.

At Step S71, the operation input portion 48 accepts an instruction from the user to select an AV stream file recorded in the MS 49 and supplies the controlling microcomputer 46 with a control signal corresponding to the instruction. For example, the AV stream file named "ABC1.mp4."

At Step S72, the controlling microcomputer 46 reads a thumbnail image file corresponding to the selected AV stream file from the MS 49 into the SDRAM 47. Specifically, the MS 49 stores a thumbnail image file whose name matches the AV stream file, except the extension, selected by the user during the process at Step S71. The reproducing process portion 164 (FIG. 5) of the controlling microcomputer 46 reads that thumbnail image file from the MS 49 and writes it to the original thumbnail image area of the SDRAM 47. For example, the reproducing process portion 164 of the controlling microcomputer 46 reads the thumbnail image file "ABC1.thm" corresponding to the selected "ABC1.mp4" from the MS 49 and writes it to the original thumbnail image area of the SDRAM 47 (see an arrow corresponding to Step S72 in FIG. 15). The thumbnail image file "ABC1.thm" is compressed and recorded based on the JPEG format during recording.

At Step S73, the image processing portion 43 decompresses the thumbnail image file. Specifically, the thumbnail image file is written to the thumbnail stream area of the SDRAM 47. During the process at Step S73, the decompression process portion 143 of the image processing portion 43 decompresses this thumbnail image file based on the JPEG format and writes this file to the original thumbnail image area of the SDRAM 47 (see an arrow corresponding to Step S73 in FIG. 15). In this manner, an original thumbnail image (uncompressed thumbnail image data) is obtained.

At Step S74, the display control portion 44 allows the display portion 45 to display the thumbnail image based on the control from the image processing portion 43. Specifically, the main control portion 141 of the image processing portion 43 reads the decompressed thumbnail image data, supplies it to the display control portion 44, and provides control so as to display the thumbnail image on the display portion 45. Under the control from the image processing portion 43, the display control portion 44 displays the thumbnail image based on the thumbnail image data. At this time, the thumbnail image is reduced to be smaller than a normal image (because the thumbnail image is reduced during the above-mentioned recording process at Step S52 in FIG. 12). The image processing portion 43 may enlarge the thumbnail image to display the enlarged thumbnail image.

When an AV stream file is selected, it is possible to fast display the thumbnail image corresponding to the AV stream file. Specifically, selecting an AV stream file can display the image (thumbnail image) corresponding to the AV stream file faster than displaying the first frame image based on the first frame image data stored in the AV stream file. This is because displaying the first frame image in the AV stream file consumes time to analyze the sample table and the like. Displaying the thumbnail image simply needs a process equivalent to that for ordinary still pictures.

At Step S75, the main control portion 161 (FIG. 5) of the controlling microcomputer 46 commands the CODEC portion 31 to start decoding.

At Step S76, the controlling microcomputer 46 reads the beginning of the AV stream file selected by the user during the process at Step S71 from the MS 49 to the SDRAM 32 (see an arrow corresponding to Step S76 in FIG. 16). Specifically, the reproducing process portion 164 of the controlling microcomputer 46 reads the beginning (e.g., a header) of the user-selected AV stream file from the MS 49 to the stream buffer area 85 of the SDRAM 32.

At Step S77, the CODEC portion 31 references the SDRAM 32 to confirm the position of the sample table (MOOV) Specifically, the reproducing process portion 127 of the CODEC portion 31 confirms the position of the sample table for the AV stream file based on the first data (e.g., header) of the AV stream file stored in the stream buffer area 85 of the SDRAM 32.

At Step S78, the CODEC portion 31 analyzes the sample table (MOOV) to confirm the AV stream position. Specifically, the reproducing process portion 127 of the CODEC portion 31 notifies the controlling microcomputer 46 of the sample table position confirmed by the process at Step S77. The reproducing process portion 164 of the controlling microcomputer 46 reads the sample table from the AV stream file in the MS 49 and supplies the read sample table to the reproducing process 127 of the CODEC portion 31. Based on the sample table, the reproducing process portion 127 of the CODEC portion 31 confirms the AV stream position (sequence and position of the frame image data and audio image data). In this manner, the sample table is analyzed and the AV stream position is confirmed.

At Step S79, the CODEC portion 31 reads the AV stream at the confirmed position in the AV stream file and stores it on the stream buffer area 85 of the SDRAM 32. Specifically, the reproducing process portion 127 of the CODEC portion 31 reads the AV stream at the confirmed position in the AV stream file (from the MS 49 via the controlling microcomputer 46) and stores the AV stream in the stream buffer area 85 of the SDRAM 32 (see an arrow corresponding to Step S79 in FIG. 16). In this manner, it is possible to read the AV stream from the first frame of the AV stream file (i.e., the beginning frame image and audio first recorded during the recording process).

At Step S80, the CODEC portion 31 prepares a state capable of reproducing frame image data from the beginning and corresponding audio (see an arrow corresponding to Step S80 in FIG. 16). At this time, the process to be performed is reverse to the recording process (Step S14 and Steps S21 through S30 in FIGS. 7 through 9). Specifically, the reproducing process portion 127 of the CODEC portion 31 sequentially reads AV streams from the MS 49 via the controlling microcomputer 46. That AV stream is stored in the stream buffer area 85 of the SDRAM 32. The demux process portion 125 of the CODEC portion 31 deinterleaves (demuxes) the AV stream to obtain frame image data and audio data. The demux process portion 125 writes the obtained frame image data to the normal video frame area 83 of the SDRAM 32 and writes the audio data to the audio frame area 84 of the SDRAM 32. It should be noted that the encoded frame image data is written to the normal video frame area 83 of the SDRAM 32 and the encoded audio data is written to the audio frame area 84. The output process portion 129 of the image processing portion 43 supplies the audio processing portion 33 with the audio data in the audio frame area 84. The audio processing portion 33 decodes the audio data based on the AAC standard. The decode process portion 123 of the CODEC portion 31 decodes the frame image data written in the normal video frame area 83 of the SDRAM 32 based on the MP4 file format standard. The decode process portion 123 writes the decoded frame image data to the original image capture area 81 of the SDRAM 32. The process so far prepares the state capable of reproduction.

At Step S81, the CODEC portion 31 reads the beginning frame image data from the SDRAM 32 and supplies it to the image processing portion 43. Specifically, the output process portion 129 of the CODEC portion 31 reads the beginning frame image data written to the original image capture area 81 of the SDRAM 32. The output process portion 129 supplies the frame image data to the image processing portion 43 (see an arrow corresponding to Step S81 in FIG. 16).

At Step S82, the CODEC portion 31 (the reproducing process portion 127 of the CODEC portion 31) notifies the controlling microcomputer 46 of completion of the reproduction preparation. Receiving this notification, the controlling microcomputer 46 commands the image processing portion 43 to replace the thumbnail image displayed on the display portion 45 with the beginning frame image data read from the AV stream file.

At Step S83, the display control portion 44 replaces (changes) the thumbnail image displayed on the display portion 45 with (to) the beginning frame image in the AV stream file based on the control from the image processing portion 43. Specifically, the main control portion 141 of the image processing portion 43 commands the display control portion 44 so as to display the beginning frame image in the AV stream file instead of the thumbnail image displayed on the display portion 45 after the process at Step S74. In accordance with this command, the display control portion 44 replaces the thumbnail image displayed on the display portion 45 with the image (beginning image) based on the beginning frame image data supplied from the CODEC portion 31. That is, the display control portion 44 allows the display portion 45 to display the image (beginning image) based on the beginning frame image data.

At Step S84, the controlling microcomputer 46 prompts a user to reproduce the AV stream file (that is selected during the process at Step S71). For example, the controlling microcomputer 46 controls the display control portion 44 so that part of a screen on the display portion 45 displays a message prompting a reproduction instruction. Alternatively, the controlling microcomputer 46 controls the audio processing portion 33 so that the speaker 34 audibly outputs a reproduction instruction. At this time, the beginning frame image is displayed in a so-called pause state, awaiting the reproduction instruction. When the AV stream file is selected (Step S71), the controlling microcomputer 46 displays the thumbnail image corresponding to the AV stream file. Thereafter, the controlling microcomputer 46 completes the preparation for reproduction of the AV stream file to await the reproduction instruction. This makes it possible to fast reproduce the AV stream file when the user instructs the reproduction.

At Step S85, the controlling microcomputer 46 determines whether or not the user uses the operation input portion 48 to input an instruction to reproduce the AV stream file. The process terminates when no instruction is input to reproduce the AV stream file (e.g., when the selected AV stream file differs form that selected in the process at Step S71).

It may be determined at Step S85 that the user uses the operation input portion 48 to input an instruction to reproduce the AV stream file. In this case, the controlling microcomputer 46 sequentially reads AV streams (image data and audio data corresponding to the second and later frame image data). The process proceeds to Step S86. The CODEC portion 31 performs decoding. Specifically, the controlling microcomputer 46 sequentially reads AV streams from the MS 49 via the MS I/F 50. The demux process portion 125 of the CODEC portion 31 demuxes the AV stream file stored in the stream buffer area 85 of the SDRAM 32. The demux process portion 125 stores the frame image data in the normal video frame area 83 of the SDRAM 32 and stores the audio data in the audio frame area 84. The decode process portion 123 of the CODEC portion 31 decodes the frame image data stored in the normal video frame area 83 based on the MP4 file format standard. The output process portion 129 supplies the audio processing portion 33 with the audio data stored in the audio frame area 84 for decoding. In this manner, the frame image data and the audio data are decoded.

At Step S86, the image processing portion 43 supplies the display control portion 44 with the frame image data decoded by the CODEC portion 31 for output to (display on) the display portion 45. The audio processing portion 33 allows the speaker 34 to output audio based on the decoded audio data. Actually, Steps S85 and S86 of the process are performed until the reproduction of the AV stream file terminates. The process terminates thereafter. When the reproduction is instructed at Step S85, the analysis of the sample table is already complete, for example. This makes it possible to fast reproduce the AV stream file.

When the AV stream file is selected according to the processes in FIGS. 13 and 14, the recording and reproducing apparatus 1 first displays the thumbnail image file corresponding to (associated with) the AV stream file. The recording and reproducing apparatus 1 analyzes the sample table for the AV stream file to read the beginning frame image data. The recording and reproducing apparatus 1 allows the display portion 45 to display the image based on the frame image data instead of the thumbnail image. Accordingly, it is possible to shorten a time interval between the time to select the AV stream file and the time to display the image (thumbnail image) corresponding to the AV stream file. The reproduction preparation (sample table analysis) is already completed when an instruction is issued to reproduce the AV stream file. The AV stream file can be fast reproduced.

Specifically, the time until displaying the beginning frame image data in the AV stream file is longer than the time until displaying the thumbnail image. When the AV stream file is selected, displaying the beginning frame image data in the AV stream file may stress the user. Even when the AV stream file is selected according to the processes in FIGS. 13 and 14, the recording and reproducing apparatus 1 fast displays an image for the thumbnail image file corresponding to the AV stream file. This can prevent the user from finding the wait time stressful. When selecting the AV stream file, the user can fast confirm its content (thumbnail image).

In this manner, the recording and reproducing apparatus 1 displays a thumbnail image (still picture) that can be reproduced in a short period of time while preparing reproduction of the AV stream file. Consequently, the user can confirm the content (beginning frame image) of the AV stream file to be reproduced until the reproduction preparation is completed. The user can wait without finding the reproduction preparation time stressful.

The processes in FIGS. 13 and 14 read the thumbnail image file, display it on the display portion 45, and then make preparations for the AV stream file reproduction. Further, it may be preferable to read and display the thumbnail image file while making preparations for the AV stream file reproduction. Specifically, it only needs to perform the process from Steps S76 to S82 in concurrence with the process from Steps S72 to S74 in FIG. 13. During reproduction, no data is interchanged between the still picture recording portion 11 and the CODEC 31 in the recording and reproducing apparatus 1 according to the embodiment. Only different timings for reading from the MS 49 cause no loads on the components.

As mentioned above, the recording and reproducing apparatus 1 uses the first video frame area 82 of the SDRAM 32 to store the beginning frame image data out of moving picture data encoded in accordance with the MP4 file format standard. The recording and reproducing apparatus 1 stores the remaining moving picture data except the beginning frame image data in another area (the normal video frame area 83) different from the first video frame area 82. Generating a thumbnail image only needs to read and use the image data stored in the first video frame area 82. The thumbnail image can be easily generated.

The thumbnail image file is recorded in association with the AV stream file. Accordingly, it is possible to fast read the thumbnail image file corresponding to the AV stream file during reproduction. Specifically, the same file name is used for the AV stream file and the thumbnail image file except the extensions. It is possible to easily specify the thumbnail image file corresponding to the AV stream file. The thumbnail image is displayed within the process time that enables the moving picture reproduction. Consequently, the user can confirm the beginning image for the selected AV stream file in advance. The user can be given the time to determine whether or not to reproduce the file.

Further, the recording and reproducing apparatus 1 handles multiple image formats such as still pictures and moving pictures. The recording and reproducing apparatus 1 records the thumbnail image for a moving picture file (AV stream file) in the still picture thumbnail format (JPEG according to the embodiment). Accordingly, it is possible to fast reproduce multiple still picture files and thumbnail image files. Specifically, the still picture recording portion 11 of the recording and reproducing apparatus in FIG. 1 implements the function to reproduce still picture files. The still picture recording portion 11 reproduces thumbnail image files similarly to still picture files without needing to use the CODEC portion 31. Therefore, thumbnail image files can be fast reproduced.

The compression process portion 142 in FIG. 4 for compressing still picture files is constructed to compress thumbnail image data corresponding to an AV stream file. There is no need for providing a special process portion to process thumbnail images for AV stream files, thus reducing costs.

An AV stream file and a thumbnail image file are provided independently. The beginning frame image is displayed by decoding the separately recorded thumbnail image file using the function (the image processing portion 43) for the still picture process without decoding the AV stream file. Accordingly, the thumbnail image can be fast displayed without transferring data between the still picture recording portion 11 and the CODEC portion 31.

The process as shown in FIGS. 7 through 9 completes the AV stream file recording (i.e., results in the affirmative determination at Step S31 in FIG. 8), and then generates a thumbnail image (Step S33) and records the thumbnail image file (Step S37). These steps are not limited after completion of the AV stream file recording. Specifically, it may be preferable to generate and record a thumbnail image during an extra time period while the AV stream file is recorded, for example. The present invention stores only the beginning frame image data out of the encoded moving picture data in the first video frame area 82 different from the normal video frame area 83. A thumbnail image can be generated during an extra time period while the AV stream file is recorded, for example.

For example, let us consider a case of storing the beginning frame image data without encoding in the SDRAM 32. The beginning frame image data consumes a large amount of data (e.g., 600 kilobytes), necessitating more capacity for the SDRAM 32. According to the embodiment, the SDRAM 32 stores the beginning frame image data after it is encoded (e.g., resulting in 80 kilobytes), making it possible to use a small memory area.

When the reproduction preparation is complete, the thumbnail image changes to the beginning frame image in the pause state. Issuing a reproduction instruction can enable reproduction with no wait time.

Let us consider a case where the controlling microcomputer 46 of the recording and reproducing apparatus 1 in FIG. 1 controls the image processing portion 43 to record thumbnail image data. In this case, it may be necessary to precisely extract the same frame as the first frame (the beginning frame image) in the moving picture data encoded by the CODEC portion 31 and record the frame as a thumbnail image. Such situation may postulate some synchronization means and increase technical difficulties. According to the present invention, however, the CODEC portion 31 stores the first frame in the first video frame area 82. After termination of the AV stream file recording, a thumbnail image is generated during an extra time period while the AV file is recorded. In this manner, the thumbnail image can be easily generated.

Thumbnail image files use the extension "THM," but the present invention is not limited thereto. It may be preferable to use any extensions that can specify thumbnail image files.

There may be a case of recording a file encoded based on the MP4 file format standard or a similar standard according to which the beginning frame image data is not always recorded at the beginning of the file. When the file has a large amount of data, analyzing all sample tables (MOOV) is time-consuming. To solve this problem, as mentioned above, the recording and reproducing apparatus according to the embodiment of the present invention displays a thumbnail image during preparations for the moving picture reproduction including the sample table analysis. The thumbnail image is generated by reducing and saving the same frame as the beginning moving picture. A user can determine the content of the moving picture and perform an operation to request the next image, for example.

The recording and reproducing apparatus 1 as shown in FIG. 1 can display thumbnail images by using only the still picture recording portion 11 (without using the CODEC portion 31). When the development aims at combining a CODEC portion with the still picture recording portion 11, for example, it is possible to use the thumbnail reproducing process operating on an existing apparatus that records still pictures. This can decreases the number of development steps.

Further, there may be a case of displaying multiple small thumbnail images for index reproduction, for example. In such case, the decompression process portion 143 of the still picture recording portion 11 can be used to reproduce thumbnail images for still pictures and moving pictures.

The same frame image data is used to generate a thumbnail image and the beginning frame for the AV stream file (moving picture data). It is possible to reduce a change in the transition of displays from the thumbnail image to the beginning frame image for moving pictures.

It is possible to smoothly provide reproduction (slide show) by mixing thumbnail images for still pictures and moving pictures.

Various meta information may be appended to the image data for management in the future. Even in such case, it is possible to make effective the means for displaying thumbnail images during preparations for the reproduction when there occurs a request to use the meta information simultaneously with the reproduction.

In the above-mentioned examples, the MS 49 is used as a recording medium, but the present invention is not limited thereto. It may be preferable to use any recording media such as IC recording media, magnetic disks, optical disks, and magnetic optical disks.

The above-mentioned examples generate a thumbnail image based on the beginning frame image data, but the present invention is not limited thereto. It may be preferable to generate a thumbnail image based on any frame image data.

Further, according to the above-mentioned examples, the image processing portion 43 uses the JPEG system for compression and decompression, but the present invention is not limited thereto. It may be preferable to use the Bitmap® or the GIF®, for example. The CODEC portion 31 is not limited to the MP4 file format standard. The present invention is also applicable when reading an AV stream file is time-consuming or the beginning of the AV stream file does not match the beginning frame image, for example.

The above-mentioned examples have described the AV stream file containing image data and audio data. The present invention is also applicable to a video stream file (moving picture file) that contains image data and not audio data.

According to the embodiment, the recording and reproducing apparatus 1 performs both the recording process and the reproducing process. It may be preferable to provide a recording apparatus to only perform the recording process and a reproducing apparatus to only perform the reproducing process. In this case, the recording apparatus performs the processes in FIGS. 7 through 9 and 12. The reproducing apparatus performs the processes in FIGS. 13 and 14.

The above-mentioned sequence of processes can be performed through the use of hardware or software. When the software is used to perform the sequence of processes, programs constituting the software maybe installed from a network or a recording medium.

As shown in FIG. 1, the recording medium is distributed independently of the computer to provide users with a program. The recording medium is constructed as a package medium composed of the removable medium 61 that records the program. In addition, the recording medium may be constructed as a hard disk that records the program and is preinstalled in the apparatus so as to be provided for users.

In this specification, the steps describing the computer program include not only a process that is performed chronologically in the described order, but also a process that is performed concurrently or individually, not always chronologically.

In this specification, the "system" signifies the entire apparatus composed of multiple apparatuses.

It should be understood by those skilled in the art that various modifications, combinations, sub-combinations and alterations may occur depending on design requirements and other factors insofar as they are within the scope of the appended claims or the equivalents thereof.

What is claimed is:

1. A recording apparatus to record data in a non-transitory recording medium, comprising:
   an input portion to input moving picture data;
   an encode portion to encode the moving picture data input by the input portion;
   a storage portion which uses a first storage area to store first-frame image data, i.e., image data for a first frame contained in the moving picture data encoded by the encode portion, and uses a second storage area to store the moving picture data except the first-frame image data, the first-frame image data and the moving picture data except the first-frame image data being encoded based on a same file format standard;
   a recording portion to record the moving picture data stored by the storage portion in the recording medium;
   a decode portion to decode the moving picture data encoded by the encode portion; and
   a thumbnail image generation portion to generate a thumbnail image based on the first-frame image data,
   wherein the recording portion records, as a moving picture file, the first-frame image data stored in the first storage area together with the moving picture data stored in the second storage area except the first-frame image data,
   wherein the decode portion decodes the first-frame image data stored in the first storage area,
   wherein the thumbnail image generation portion generates thumbnail image data based on the first-frame image data decoded by the decode portion,
   wherein the recording portion composes a thumbnail image file from the thumbnail image data generated by the thumbnail image generation portion and records the thumbnail image file in association with the recorded moving picture file, and
   wherein the thumbnail file is recorded with the same name as the moving picture file except an extension.

2. The recording apparatus according to claim 1, further comprising:
   a compression portion to compress the thumbnail image data generated by the thumbnail image generation portion in a format for still picture processing,
   wherein the recording portion records the thumbnail image data compressed by the compression portion as a thumbnail image file in association with the recorded moving picture file.

3. The recording apparatus according to claim 1,
   wherein the encode portion encodes the moving picture data based on an MP4 file format standard; and
   wherein the decode portion decodes the encoded moving picture data based on the MP4 file format standard.

4. A recording method for a recording apparatus to record data in a non-transitory recording medium, comprising:
   an input step of inputting moving picture data;
   an encode step of encoding the moving picture data input by a process at the input step;
   a first storage control step of controlling storage so that a first storage area of a storage portion stores first-frame image data, i.e., image data for a first frame contained in the moving picture data encoded by a process at the encode step;
   a second storage control step of controlling storage so that a second storage area of the storage portion stores the moving picture data encoded by a process at the encode step except the first-frame image stored in the first storage area;
   a first recording control step of controlling recording so as to record, as a moving picture file in the recording medium, the first-frame image data stored in the first storage area together with moving picture data stored in the second storage area except the first-frame image data;
   a decode step of decoding the first-frame image data stored in the first storage area;
   a thumbnail image generation step of generating thumbnail image data based on the first-frame image data decoded by a process at the decode step, wherein the thumbnail file is recorded with the same name as the moving picture file except an extension; and
   a second recording control step of controlling recording so as to compose a thumbnail image file from the thumbnail image data generated by a process at the thumbnail image generation step and record the thumbnail image data in the recording medium in association with the recorded moving picture file,
   wherein the first-frame image data and the moving picture data except the first-frame image data are encoded based on a same file format standard.

5. A program for controlling processes to record data on a non-transitory recording medium and allowing a computer to perform a process comprising:
   an input step of inputting moving picture data;
   an encode step of encoding the moving picture data input by a process at the input step;
   a first storage control step of controlling storage so that a first storage area of a storage portion stores first-frame image data, i.e., image data for a first frame contained in the moving picture data encoded by a process at the encode step;
   a second storage control step of controlling storage so that a second storage area of the storage portion stores the moving picture data encoded by a process at the encode step except the first-frame image stored in the first storage area;

a first recording control step of controlling recording so as to record, as a moving picture file in the recording medium, the first-frame image data stored in the first storage area together with moving picture data stored in the second storage area except the first-frame image data;

a decode step of decoding the first-frame image data stored in the first storage area;

a thumbnail image generation step of generating thumbnail image data based on the first-frame image data decoded by a process at the decode step, wherein the thumbnail file is recorded with the same name as the moving picture file except an extension; and a second recording control step of controlling recording so as to compose a thumbnail image file from the thumbnail image data generated by a process at the thumbnail image generation step and record the thumbnail image data in the recording medium in association with the recorded moving picture file, wherein the first-frame image data and the moving picture data except the first-frame image data are encoded based on a same file format standard.

6. A reproducing apparatus to reproduce a non-transitory recording medium which records a moving picture file containing moving picture data and a thumbnail image file containing thumbnail image data associated with the moving picture file, the reproducing apparatus comprising:

a read portion to read the moving picture file and the thumbnail image file associated with the moving picture file from the recording medium; and a display control portion which controls a display portion so as to display a thumbnail image based on the thumbnail image file read by the read portion and a moving picture based on the moving picture file, wherein, when the moving picture file is selected, the read portion reads the thumbnail image file associated with the moving picture file;

wherein the display control portion controls a display portion so as to display a thumbnail image based on the thumbnail image file read by the read portion;

wherein the read portion further reads the moving picture file; and wherein, when the read portion has completed reading of a beginning frame in the moving picture file, the display control portion controls a display portion so as to display a moving picture based on the moving picture file instead of the thumbnail image displayed on the display portion, and wherein the thumbnail file is recorded with the same name as the moving picture file except an extension.

7. The reproducing apparatus according to claim 6 further comprising:

a decompression portion to decompress compressed thumbnail image data for the thumbnail image file; and a decode portion to decode the encoded moving picture data for the moving picture file, wherein, when the moving picture file is selected, the read portion reads the thumbnail image file associated with the moving picture file;

wherein the decompression portion decompresses compressed thumbnail image data for the thumbnail image file read by the read portion;

wherein the display control portion controls a display portion so as to display a thumbnail image based on the thumbnail image data decompressed by the decompression portion;

wherein the read portion further reads the moving picture file;

wherein the decode portion decodes encoded moving picture data for the moving picture file read by the read portion; and wherein, when the decode portion has completed decoding of the moving picture data, the display control portion controls a display portion so as to display a moving picture based on the moving picture data instead of the thumbnail image displayed on the display portion.

8. The reproducing apparatus according to claim 6, wherein the thumbnail image data corresponds to beginning frame image data in the moving picture file.

9. The reproducing apparatus according to claim 6 further comprising:

a decompression portion to decompress compressed thumbnail image data for the thumbnail image file; and a decode portion to decode the encoded moving picture data for the moving picture file, wherein the thumbnail image data corresponds to beginning frame image data in the moving picture file;

wherein, when the moving picture file is selected, the read portion reads the thumbnail image file associated with the moving picture file;

wherein the decompression portion decompresses compressed thumbnail image data for the thumbnail image file read by the read portion;

wherein the display control portion controls a display portion so as to display a thumbnail image based on the thumbnail image data decompressed by the decompression portion;

wherein the read portion further reads beginning frame image data in the moving picture file;

wherein the decode portion decodes encoded beginning frame image data in the moving picture file read by the read portion;

wherein, when the decode portion has completed decoding of the beginning frame image data, the display control portion controls the display portion so as to display an image based on the beginning frame image data instead of the thumbnail image displayed on the display portion;

wherein, when the display control portion allows the display portion to display an image based on the beginning frame image data in the moving picture file and then commands reproduction of a moving picture file, the read portion sequentially reads second and later frame image data in the moving picture file;

wherein the decode portion sequentially decodes encoded second and later frame image data in the moving picture file read by the read portion; and wherein the display control portion sequentially controls the display portion so as to display a moving picture based on second and later frame image data decoded by the decode portion in the moving picture file.

10. The reproducing apparatus according to claim 7, wherein an MP4 file format standard is used as a basis for encoding the moving picture data contained in the moving picture file recorded on the recording medium; and wherein the decode portion decodes the encoded moving picture data based on the MP4 file format standard.

11. A reproduction method for a reproducing apparatus to reproduce a non-transitory recording medium which records a moving picture file composed of moving picture data and a thumbnail image file composed of thumbnail image data associated with the moving picture file, the method comprising:

a first read step of, reading the thumbnail image file associated with the moving picture file, when selected, from the recording medium;

a first display control step of controlling a display portion so as to display a thumbnail image based on the thumbnail image file read by a process at the first read step;

a second read step of reading the moving picture file from the recording medium; and a second display control step of, when a process at the second read step has completed reading of a beginning frame in the moving picture file, controlling the display portion so as to display a moving picture based on the moving picture file instead of the thumbnail image displayed on the display portion, wherein the thumbnail file is recorded with the same name as the moving picture file except an extension.

12. A program for controlling processes to reproduce a non-transitory recording medium which records a moving picture file composed of moving picture data and a thumbnail image file composed of thumbnail image data associated with the moving picture file, and allowing a computer to perform a process comprising:

a first read step of reading the thumbnail image file associated with the moving picture file, when selected, from the recording medium;

a first display control step of controlling a display portion so as to display a thumbnail image based on the thumbnail image file read by a process at the first read step;

a second read step of reading the moving picture file from the recording medium; and a second display control step of, when a process at the second read step has completed reading of a beginning frame in the moving picture file, controlling the display portion so as to display a moving picture based on the moving picture file instead of the thumbnail image displayed on the display portion, wherein the thumbnail file is recorded with the same name as the moving picture file except an extension.

* * * * *